(12) United States Patent
Gotou et al.

(10) Patent No.: US 9,010,917 B2
(45) Date of Patent: Apr. 21, 2015

(54) INKJET RECORDING METHOD AND INKJET PRINTED MATTER

(71) Applicants: Hiroshi Gotou, Shizuoka (JP); Hidetoshi Fujii, Shizuoka (JP); Kohta Akiyama, Tokyo (JP)

(72) Inventors: Hiroshi Gotou, Shizuoka (JP); Hidetoshi Fujii, Shizuoka (JP); Kohta Akiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 13/893,622

(22) Filed: May 14, 2013

(65) Prior Publication Data

US 2013/0323474 A1     Dec. 5, 2013

(30) Foreign Application Priority Data

May 30, 2012    (JP) ................................. 2012-123715

(51) Int. Cl.
     *C09D 11/322*      (2014.01)
     *C09D 11/36*      (2014.01)
     (Continued)

(52) U.S. Cl.
     CPC . *C09D 11/36* (2013.01); *B41J 2/01* (2013.01); *B41M 5/0023* (2013.01); *C09D 11/322* (2013.01); *C09D 11/38* (2013.01)

(58) Field of Classification Search
     CPC ...... C07D 11/322; C07D 11/36; C07D 11/38; B41M 5/0023; B41M 5/00; B41J 2/01; C09D 11/322; C09D 11/36; C09D 11/38
     USPC ........................................ 428/195.1; 347/100
     See application file for complete search history.

(56) References Cited

U.S. PATENT DOCUMENTS 5,224,987 A     7/1993   Matrick
(Continued)

FOREIGN PATENT DOCUMENTS

CN     1497023 A     5/2004
(Continued)

OTHER PUBLICATIONS

U.S. Appl. No. 13/683,000, filed Nov. 21, 2012.
(Continued)

*Primary Examiner* — Bruce H Hess
(74) *Attorney, Agent, or Firm* — Oblon, McClelland, Maier & Neustadt, L.L.P.

(57) ABSTRACT

An inkjet recording method includes using ink for inkjet recording containing a hydrodispersible colorant, a surfactant, water, and an organic solvent containing a polyol, an amide compound represented by the following Formula I, and an oxetane compound represented by the following Formula II; using a recording medium having a particular transfer amount of highly deionized water as measured by an automatic scanning absorptometer; and forming an image on the recording medium with the ink, wherein the ink has a particular wettability, where γ' represents dynamic surface tension as measured by maximum bubble pressure technique and θ represents a contact angle, Formula 1

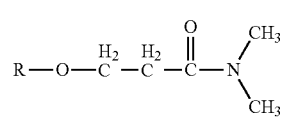

where R represents an alkyl group,

Formula 2

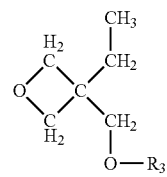

where $R_3$ represent a hydrogen atom, an alkyl group having 1 to 8 carbon atoms, a cyclohexyl group, and a phenyl group.

7 Claims, 1 Drawing Sheet

(51) Int. Cl.
*C09D 11/38* (2014.01)
*B41M 5/00* (2006.01)
*B41J 2/01* (2006.01)

(56) References Cited

U.S. PATENT DOCUMENTS

| | | |
|---|---|---|
| 2007/0197685 A1 | 8/2007 | Aruga et al. |
| 2008/0233363 A1 | 9/2008 | Goto |
| 2009/0043028 A1 | 2/2009 | Matsuyama et al. |
| 2009/0098312 A1 | 4/2009 | Goto et al. |
| 2009/0176070 A1 | 7/2009 | Goto et al. |
| 2010/0196601 A1 | 8/2010 | Goto et al. |
| 2010/0196602 A1 | 8/2010 | Koyano et al. |
| 2010/0295891 A1 | 11/2010 | Goto et al. |
| 2011/0057981 A1 | 3/2011 | Aruga et al. |
| 2011/0164086 A1 | 7/2011 | Ggoto et al. |
| 2011/0310166 A1 | 12/2011 | Namba et al. |
| 2012/0098883 A1 | 4/2012 | Matsuyama et al. |
| 2012/0207983 A1 | 8/2012 | Matsuyama et al. |
| 2012/0293582 A1 | 11/2012 | Goto et al. |
| 2012/0320137 A1 | 12/2012 | Fujii et al. |
| 2013/0002776 A1 | 1/2013 | Nagashima et al. |
| 2013/0065028 A1 | 3/2013 | Fujii et al. |
| 2013/0070017 A1 | 3/2013 | Fujii et al. |
| 2013/0071637 A1 | 3/2013 | Matsuyama et al. |

FOREIGN PATENT DOCUMENTS

| | | | |
|---|---|---|---|
| CN | 1791648 A | | 6/2006 |
| CN | 101316718 A | | 12/2008 |
| JP | 10-110129 | | 4/1998 |
| JP | 11-057458 | | 3/1999 |
| JP | 11-189739 | | 7/1999 |
| JP | 11-246807 | | 9/1999 |
| JP | 11-323232 | | 11/1999 |
| JP | 2000-265094 | | 9/2000 |
| JP | 2000-512670 | | 9/2000 |
| JP | 2002-331748 | | 11/2002 |
| JP | 2003-513137 | | 4/2003 |
| JP | 2003-192955 | | 7/2003 |
| JP | 2003-277658 | | 10/2003 |
| JP | 2005-220218 | | 8/2005 |
| JP | 2007-162006 | | 6/2007 |
| JP | 2007-238916 | | 9/2007 |
| JP | 2010-168433 | | 8/2010 |
| JP | 2010-180332 A | | 8/2010 |
| WO | WO97/47699 A1 | | 12/1997 |
| WO | WO97/48769 A1 | | 12/1997 |
| WO | WO01/30918 A1 | | 5/2001 |
| WO | WO 2009/133796 A1 | | 11/2009 |
| WO | WO 2010/150913 A1 | | 12/2010 |
| WO | WO 2011/021591 A1 | | 2/2011 |

OTHER PUBLICATIONS

U.S. Appl. No. 13/755,257, filed Jan. 31, 2013.
U.S. Appl. No. 13/680,386, filed Nov. 19, 2012.
U.S. Appl. No. 13/719,604, filed Dec. 19, 2012.
U.S. Appl. No. 13/719,631, filed Dec. 19, 2012.
U.S. Appl. No. 13/810,917, filed Jul. 29, 2011.
U.S. Appl. No. 13/719,631, filed Dec. 19, 2012, Yokohama, et al.
U.S. Appl. No. 13/719,604, filed Dec. 19, 2012, Yokohama, et al.
Combined Office Action and Search Report issued Sep. 30, 2014, in Chinese Patent Application No. 201310209761.3 with English translation of category of cited documents.

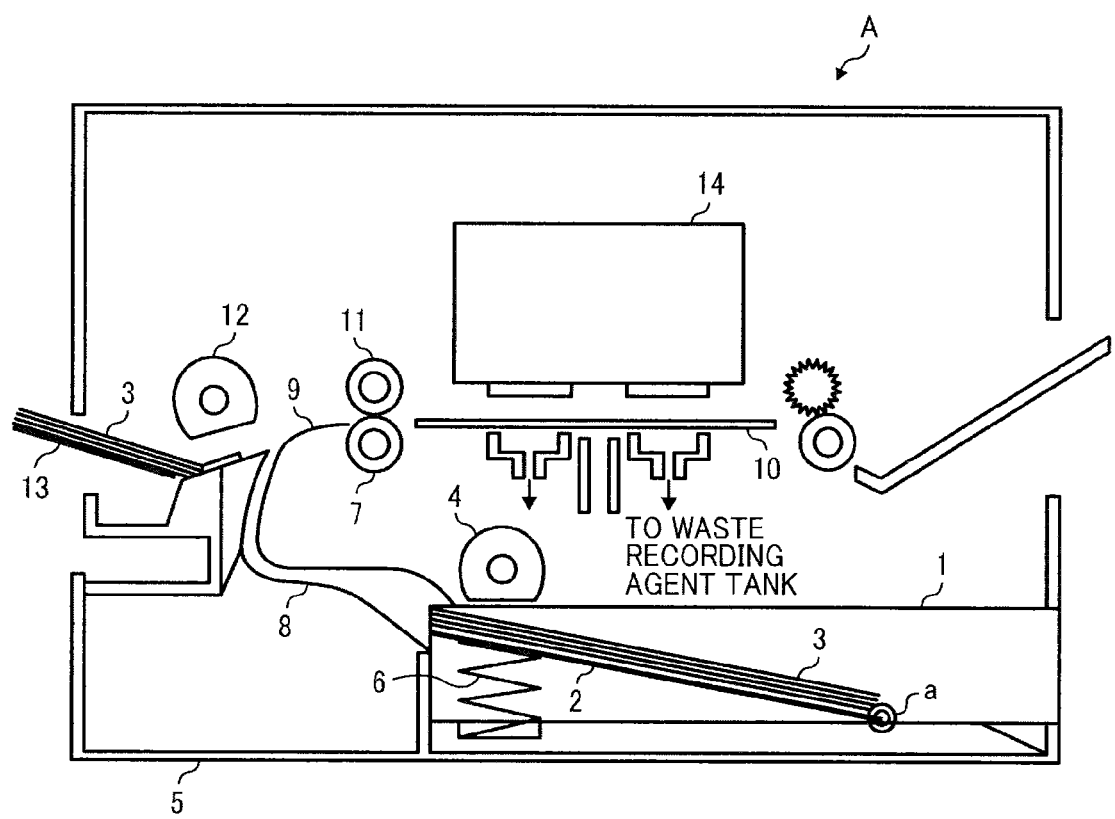

INKJET RECORDING METHOD AND INKJET PRINTED MATTER

CROSS-REFERENCE TO RELATED APPLICATIONS

This patent application is based on and claims priority pursuant to 35 U.S.C. §119 to Japanese Patent Application No. 2012-123715, filed on May 30, 2012, in the Japan Patent Office, the entire disclosure of which is hereby incorporated by reference herein.

BACKGROUND

1. Technical Field

The present invention relates to an inkjet recording method and inkjet printed matter.

2. Background Art

Inkjet printers employing inkjet recording system have rapidly come into widespread use because of their compactness, inexpensiveness, and easy colorization.

Accordingly, the demand for high-quality inkjet printed matter and faster printing speeds has been increasing in recent years. To meet this demand, ink for use in inkjet recording is required to satisfy various characteristics. In particular, the image quality of the printed matter matters. However, image quality depends on what kind of media is used.

Among efforts made to improve the image quality of inkjet printed matter, ameliorating the permeability of ink is well known. Although this technology is successful in some degree, it is not sufficient to satisfy the demand.

JP-2007-238916-A discloses that, to produce high-density images using high-speed printing, the surface tension of aqueous ink for inkjet recording ranges from $15 \leq \gamma \cos \theta \leq <27$.

JP-4427926-B1 (JP-2002-331748-A) discloses black ink having a contact angle of from 60° to 90° and a surface tension of from 20 mN/m to 40 mN/m 0.1 seconds after an ink droplet contacts a recording medium to achieve blur-free high image quality using quick-drying ink.

JP-4603756-B1 (JP-2003-277658-A) discloses a dynamic contact angle of from 50.0° to 71.1° when ejecting 2 µl of ink onto plain paper having a St·ckigt sizing degree of 30 seconds or less to avoid producing images with non-uniform low image density and blurring on plain paper.

SUMMARY

The present invention provides an inkjet recording method including: using ink for inkjet recording containing a hydrodispersible colorant having a functional group, a surfactant, water, and an organic solvent containing at least one kind of polyol having an equilibrium moisture of 30 percent by weight or greater at 23° C. and 80 percent RH, an amide compound represented by the following Formula I, and an oxetane compound represented by the following Formula II; using a recording medium having a transfer amount of highly deionized water of from 5 ml/m² to 20 ml/m² during a contact time of 100 msec and 5 ml/m² to 30 ml/m² during a contact time of 400 msec, in which the transfer amount is measured by an automatic scanning absorptometer, and forming an image on the recording medium with the ink. The ink has a wettability γ' cos θ of from 19.0 to 24.0 150 msec after dripping 2.5 µl of the ink onto the recording medium and γ' is 26 mN/m or less, where γ' represents dynamic surface tension at a surface life of 150 msec at 25° C. and 50 percent RH as measured by maximum bubble pressure technique and θ represents a contact angle 150 msec at 25° C. and 50 percent RH after 2.5 µl of the ink is dripped on the recording medium,

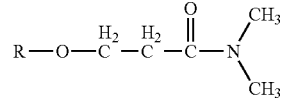

Formula 1 where R represents an alkyl group having 4 to 6 carbon atoms,

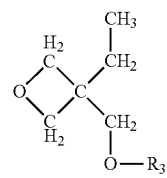

Formula 2 where $R_3$ represent a hydrogen atom, an alkyl group having 1 to 8 carbon atoms, a cyclohexyl group, and a phenyl group.

BRIEF DESCRIPTION OF THE DRAWING

Various other objects, features and attendant advantages of the present invention will be more fully appreciated as the same becomes better understood from the detailed description when considered in connection with the accompanying drawings in which like reference characters designate like corresponding parts throughout and wherein:

FIGURE is a schematic view illustrating an example of an inkjet printer for use in an embodiment of the present invention.

DETAILED DESCRIPTION

The present invention is to provide an inkjet recording method producing high quality images (regarding image density, text blurring, and re-transferability) even on plain paper.

Embodiments are described in detail below.

An embodiment is an inkjet recording method including using ink for inkjet recording containing an hydrodispersible colorant having a functional group, a surfactant, water, and an organic solvent containing at least one kind of polyol having an equilibrium moisture of 30 percent by weight or greater at 23° C. and 80 percent RH, an amide compound represented by the following Formula I, and an oxetane compound represented by the following Formula II, using a recording medium having a transfer amount of highly deionized water of from 5 ml/m² to 20 ml/m² during a contact time of 100 msec and 5 ml/m² to 30 ml/m² during a contact time of 400 msec in which the transfer amount is measured by an automatic scanning absorptometer, and forming an image on the recording medium with the ink, wherein the ink has a wettability γ' cos θ of from 19.0 to 24.0 150 msec after dripping 2.5 µl of the ink onto the recording medium and γ' is 26 mN/m or less, where γ' represents dynamic surface tension at a surface life of 150 msec at 25° C. and 50 percent RH as measured by maximum bubble pressure technique and θ represents a contact angle at 25° C. and 50 percent RH 150 msec after 2.5 µl of the ink is dripped on the recording medium, Formula 1

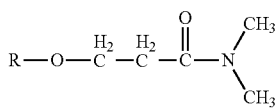

where R represents an alkyl group having 4 to 6 carbon atoms,

Formula 2

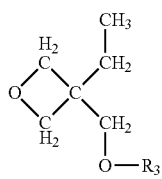

where $R_3$ represent a hydrogen atom, an alkyl group having 1 to 8 carbon atoms, a cyclohexyl group, and a phenyl group. In this Embodiment, the following is preferable and described together.

The inkjet recording method mentioned above, wherein the organic solvent further contains an amide compound represented by the following Chemical Structure I Chemical Structure I

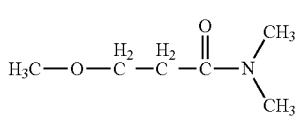

The inkjet recording method mentioned above, wherein the hydrodispersible colorant contains a black pigment, a cyan pigment, a magenta pigment, a yellow pigment, and a combination thereof.

The inkjet recording method mentioned above, wherein the surfactant is a fluorine containing surfactant.

Also an inkjet printed matter is provided which includes a recording medium; and an image formed thereon by the inkjet recording method mentioned above.

As a result of an investigation made by the present inventors, the present inventors have found that when forming an image on a recording medium such as plain paper with ink for inkjet recording containing the particular polyol, amide compound, and oxetane compound as the organic solvent, images having high quality (regarding image density, text blurring, and re-transferability) are formed on plain paper to obtain ink printed matter if the wettability $\gamma'$ cos θ ranges from 19.0 to 24.0 150 msec after dripping 2.5 μl of the ink and $\gamma'$ is 26 mN/m or less.

This mechanism is not clear but the present inventors inferred that the balance between the hydrophobicity and hydrophilicity of the ink became suitable to a recording medium, so that ink dots quickly permeate the recording medium by moderately expanding on the recording medium, which improved the image density, text blurring, and re-transferability.

$\gamma'$ of $\gamma'$ cos θ represents the dynamic surface tension at a surface life of 150 msec at 25° C. and 50 percent RH as measured by maximum bubble pressure technique and θ represents a contact angle at 25° C. and 50 percent RH 150 msec after 2.5 μl of the ink is dripped on the recording medium.

The dynamic surface tension $\gamma'$ can be measured by, for example, SITA_DynoTester (available from SITA).

In addition, 150 msec after the dripping is the right timing to measure the contact angle. The measuring error is large when the measuring time is shorter than 150 msec.

The ink penetration proceeds in some degree so that the contact angle becomes narrow, which makes it ambiguous about the relation with the image quality when longer than 150 msec. The contact angle can be measured by OCAH200 (available from DataPhysics). When $\gamma'$ is 26 mN/m or lower, the wettability (dot expansion) and the permeation of the ink to a recording medium is improved, thereby increasing the solid image uniformity, resulting in improvement of the image density. By improving the permeation to a recording medium, wetting agents, solvents, and water permeate a recording medium instantly, thereby improving the re-transferability.

When $\gamma'$ cos θ or $\gamma'$ is outside the range specified above, the dot is not filled with ink, thereby reducing the image density, degrading text blurring, or limiting the transferability.

In this embodiment, high quality images can be formed on a recording medium (plain paper) having a transfer amount of highly deionized water of from 5 ml/m$^2$ to 20 ml/m$^2$ during a contact time of 100 msec and from 5 ml/m$^2$ to 30 ml/m$^2$ during a contact time of 400 msec, as measured by an automatic scanning absorptometer. This plain paper includes photocopying paper (plain paper) for general use, recycled paper, ColorLok paper, etc.

Ink for Inkjet

Organic Solvent

In this Embodiment, by using ink containing the organic solvent that contains the amide compound represented by Formula I, and the oxetane compound represented by Formula II, the ink permeability is improved. It is not possible to obtain usable ink without the amide compound and the oxetane compound represented by the Formulae I and II.

The total content of the amide compound represented by Formula I and the oxetane compound represented by Formula II is preferably from 1 percent by weight to 50 percent by weight and more preferably from 2 percent by weight to 40 percent by weight.

When the content is too small, neither the permeability or the image quality tends to be improved.

When the content is too large, the ink viscosity tends to rise, thereby degrading the dischargeability of ink.

Specific examples of the compounds represented by Formulae I and II include, but are not limited to the following:

Amide Compounds Represented By Formula I

Chemical Structure II

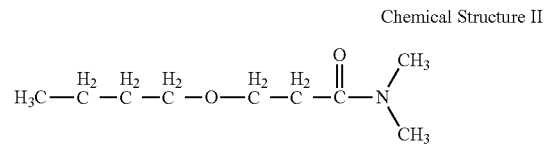

Chemical Structure III

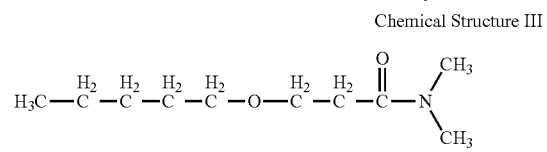

Chemical Structure IV

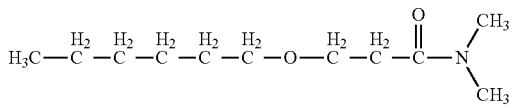

Oxetane Compound represented By Formula II

Chemical Structure V

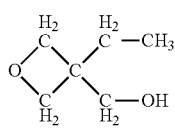

Chemical Structure VI

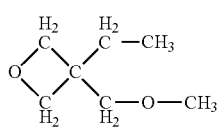

Chemical Structure VII

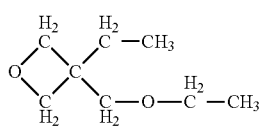

Chemical Structure VIII

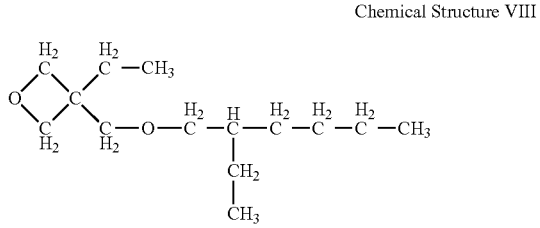

Chemical Structure IX

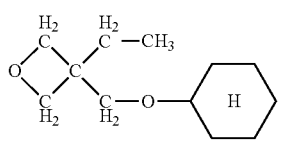

Chemical Structure X

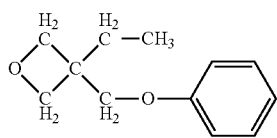

The amide compound represented by Formula I has a high boiling point of 216° C., a high equilibrium moisture amount of 39.2 percent by weight at 23° C. and 80 percent, and an extremely low liquid viscosity of 1.48 mPa·s at 25° C. Both the amide compound represented by Formula I and the oxetane compound represented by Formula II are easily dissolved in other organic solvent such as a polyol or water. Therefore, if the amide compound represented by Formula I is contained, the viscosity of the ink decreases. As a consequence, the ink has good storage stability and discharging stability and is friendly to a maintenance device for an ink discharging device.

The content of the amide compound represented by Formula I is preferably from 1 percent by weight to 50 percent by weight and more preferably from 2 percent by weight to 40 percent by weight. When the content is too small, the viscosity of the ink does not easily decrease. In addition, when the content is too large, the drying property of the ink on recording media (typically, paper) tends to be inferior and the text quality on plain paper may deteriorate.

The polyol having an equilibrium moisture of 30 percent by weight or greater at 23° C. and 80 percent RH, is contained as a wetting agent.

In particular, a polyol having a high equilibrium moisture and a boiling point is preferable.

Specific examples thereof include, but are note limited to, diethylene glycol (boiling point: 245° C., 43 percent by weight), triethylene glycol (boiling point: 285° C., 39 percent by weight), tetraethylene glycol (boiling point: 324° C., 37 percent by weight), 1,3-butane diol (boiling point: 203° C. to 204° C., 35 percent by weight), glycerine (boiling point: 290° C., 49 percent by weight), diglycerine (boiling point: 270° C./270 hPa, 38 percent by weight), 1,2,3-butane triol (boiling point: 175° C./33 hPa, 38 percent by weight), and 1,2,4-butane triol (boiling point: 190° C. to 191° C./24 hPa, 41 percent by weight). Among these, glycerine and 1,3-butane diol are preferable.

The content of the polyol in the ink is preferably from 2 percent by weight to 30 percent by weight and more preferably from 5 percent by weight to 20 percent by weight.

When the content is too small, the ink moisturing effect does not tend to be exhibited, thereby degrading the ink discharging stability and the attachment prevention effect of waste ink to the ink discharging maintainance unit.

In addition, when the content is too large, the prevention of curling of paper and the drying property tend to be inferior and moreover, the text quality on plain paper may deteriorate.

Specifically, the equilibrium moisture content (percent) can be obtained as follows: while keeping the temperature and the humidity in a desiccator using a saturated potassium chloride sodium chloride solution in the range of from 22° C. to 24° C. and from 77 percent RH to 83 percent RH, respectively, a petri dish on which 1 g of each of organic solvent is placed is preserved in the desiccator to measure the equilibrium moisture followed by calculation based on the following Relation.

Equilibrium Moisture Amount (%)=(Moisture Amount Absorbed in the Organic Solvent/ Amount of Organic Solvent+Moisture Amount Absorbed Therein)×100

The ink may contain a wetting agent and an organic solvent other than the above-specified organic solvent.

Specific examples thereof include, but are note limited to, polyols, polyol alkyl ethers, polyol aryl ethers, nitrogen-containing heterocyclic compounds, amides, amines, sulfur-containing compounds, propylene carbonates, ethylene carbonates, and other wetting agents.

Specific examples of the polyols include, but are not limited to, dipropylene glycol (boiling point: 232° C.), 1,5-pentane diol (boiling point: 242° C.), propylene glycol (boiling point: 187° C.), 2-methyl-2,4-pentane diol (boiling point: 197° C.), ethylene glycol (boiling point: 196° C. to 198° C.), tripropylene glycol (boiling point: 267° C.), hexylene glycol (boiling point: 197° C.), polyethylene glycol (viscostic liquid to solid), polypropylene glycol (boiling point: 187° C.), 1,6-hexane diol (boiling point: 253° C. to 260° C.), 1,2,6-hexane triol (boiling point: 178° C.), trimethylol ethane (solid; melting point: 199° C. to 201° C.), and trimethylol propane (solid; melting point: 61° C.).

Specific examples of the polyol alkyl ethers include, but are not limited to, ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 197° C.), diethylene glycol monobutyl ether (boiling point:

231° C.), ethylene glycol mono-2-ethylhexyl ether (boiling point: 229° C.), and propylene glycol monoethyl ether (boiling point: 132° C.).

Specific examples of the polyol aryl ethers include, but are not limited to, ethylene glycol monophenyl ether (boiling point: 237° C.) and ethylene glycol monobenzyl ether.

Specific examples of nitrogen-containing heterocyclic compounds include, but are not limited to, 2-pyrolidone (boiling point: 250° C., melting point: 25.5° C., 47 percent by weight to 48 percent by weight), N-methyl-2-pyrolidone (boiling point: 202° C.), 1,3-dimethyl imidazoline (boiling point: 226° C.), ε-caprolactam (boiling point: 270° C.), and γ-butylolactone (boiling point: 204° C. to 205° C.).

Specific examples of the amides include, but are not limited to, formamide (boiling point: 210° C.), N-methyl formamide (boiling point: 199° C. to 201° C.), N,N-dimethyl formamide (boiling point: 153° C.), and N,N-diethylformamide (boiling point: 176° C. to 177° C.).

Specific examples of the amines include, but are not limited to, monoethanol amine (boiling point: 170° C.), diethanol amine (boiling point: 268° C.), triethanol amine (boiling point: 360° C.), N,N-dimethyl monoethanol amine (boiling point: 139° C.), N-methyl diethanol amine (boiling point: 243° C.), N-methylethanol amine (boiling point: 159° C.), N-phenyl ethanol amine (boiling point: 282° C. to 287° C.), and 3-aminopropyl diethyl amine (boiling point: 169° C.).

Specific examples of the sulfur-containing compounds include, but are not limited to, dimethyl sulphoxide (boiling point: 139° C.), sulfolane (boiling point: 285° C.), and thiodiglycol (boiling point: 282° C.).

Sugar groups are also preferable as the solid wetting agents. Specific examples of the sugar groups include, but are not limited to, monosaccharides, disaccharides, oligosaccharides (including triaccharides and tetrasaccharides), and polysaccharides.

Specific examples thereof include, but are not limited to, glucose, mannose, fructose, ribose, xylose, arabinose, galactose, maltose, cellobiose, lactose, saccharose, trehalose, and maltotriose.

Polysaccharides represent sugar in a broad sense and contain materials that are present widely in nature, for example, a-cyclodextrine and cellulose. In addition, specific examples of derivatives of these sugar groups include, but are not limited to, reducing sugars (for example, sugar alcohols (represented by $HOCH_2(CHOH)_nCH_2OH$, where n represents an integer of from 2 to 5) of the sugar groups specified above, oxidized sugars (e.g., aldonic acid and uronic acid), amino acid, and thio acid.

Among these, sugar alcohols are preferable and specific examples thereof include, but are not limited to, maltitol and sorbit.

The content of the organic solvent and the wetting agent is preferably from 30 percent by weight to 70 percent by weight and more preferably from 35 percent by weight to 60 percent by weight including the amide compound represented by Formula I and the oxetane compound represented by Formula II, the amide compound represented by the Chemical Structure I, the polyol, alkane diol, etc.

Hydrodispersible Colorant

The hydrodispersible colorants having a functional group for use in the embodiment employ, for example, the following first and the second forms.

1) In the first form, the hydrodispersible colorant has a pigment that has at least one kind of hydrophillic group on the surface and is hydrodispersible under the presence of no dispersing agent (hereinafter referred to as self-dispersing pigment).

2) In the second form, the hydrodispersible colorant contains a polymer emulsion (water dispersion material of polymer particulates containing a coloring material, e.g., pigment) in which polymer particulates having at least one functional group on its surface contain a pigment having no or little solubility in water.

Inorganic pigments and organic pigments can be used as the pigment. Any dye can be used to control the color unless it degrades the weatherability.

Specific examples of the inorganic pigments include, but are not limited to, titanium oxide, iron oxide, calcium oxide, barium sulfate, aluminum hydroxide, barium yellow, chrome yellow, and carbon black. Among these, carbon black is particularly preferable. Carbon black that is manufactured by, for example, a known method such as a contact method, a furnace method, and a thermal method can be used.

Specific examples of carbon black includes, but are not limited to, Pigment Black 7, Channel black, Furnace Black, Gas Black, and Lamp Black.

Specific examples of the products thereof available from the market include, but are not limited to, Regal®, Black Pearls®, Elftex®, Monarch®, Mogul®, and Vulcan®, all of which are available from Cabot Corporation.

Specific examples of the organic pigments include, but are not limited to, azo pigments, polycyclic pigments, dye chleates, nitoro pigments, nitroso pigments, and aniline black. Among these, azo pigments and polycyclic pigments are more preferable. Specific examples of the azo pigments include, but are not limited to, azo lake, insoluble azo pigments, condensation azo pigments, and chleate azo pigments. Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments. Specific examples of the dye chleates include, but are not limited to, bass dye type chleates, and acid dye type chleates.

Specific examples of the organic pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 153, and 183; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15, 15:1, 15:3 (Phthalocyanine Blue), 16, 17:1, 56, 60, and 63; C.I. Pigment Green 1, 4, 7, 8, 10, 17, 18, and 36.

Moreover, since ion groups or ionizable groups are introduced to the surface, pigments oxidized by using an oxidant are also usable.

Surface-treated pigments that have ionicity are preferable.

Specific examples of the ionic groups include, but are not limited to, anionic polar group such as a carboxylic acid group, a sulfonic acid group, and phosphporic acid group. A carbonic acid group or p-amino benzoic acid group are preferable.

An amide group and a sulfone amide group are also suitable.

Specific examples thereof include, —COOM, $SO_3M$, $PO_3HM$, —$PO_3M_2$, —$CONM_2$, —$SO_3NM_2$, —NH—$C_6H_4$—COOM, —NH—$C_6H_4$—$SO_3M$, —NH—$C_6H_4$—

PO$_3$HM, —NH—C$_6$H$_4$—PO$_3$M$_2$, —NH—C$_6$H$_4$—CONM$_2$, —NH—C$_6$H$_4$, and —SO$_3$NM$_2$.

Specific examples of the counter ion M include, but are not limited to, alkali metal ion and quaternary ammonium ion.

Specific examples of quaternary ammonium ions include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion.

Among these, tetraethyl ammonium ion, tetrabutyl ammonium ion, and benzyl trimethyl ammonium ion are preferable and tetrabutyl ammonium ion is particularly preferable.

The anionic functional group can be linked to the surface of the pigment particle by the methods disclosed in JP-4697757-B1, JP-2003-513137-A, WO97/48769, JP-H10-110129-A, JP-H10-246807-A, JP-H11-57458-A, JP-H11-189739-A, JP-H11-323232-A, and JP-2000-265094-A.

In the Embodiment, by using the hydrodispersible colorant having the anionic functional group or quaternary ammonium ion, the affinity is exhibited in both water rich ink and organic solvent rich ink from which water has evaporated so that the dispersion state of the hydrodispersible colorant is stably maintained.

BET specific surface area of the pigment is preferably from about 10 m$^2$/g to about 1,500 m$^2$/g, more preferably from about 20 m$^2$/g to about 600 m$^2$/g, and most preferably from about 50 m$^2$/g to about 300 m$^2$/g.

Unless a pigment having such a suitable BET specific surface area is available, it is suitable to pulverize the pigment by using, for example, a ball mill, a jet mill, or ultrasonic wave to make it have a small particle diameter.

The volume average particle diameter (D50) of the hydrodispersible colorant in the ink preferably ranges from 10 nm to 200 nm.

The content of the hydrodispersible colorant in the ink is preferably from 1 percent by weight to 15 percent by weight and more preferably from 2 percent % by weight to 10 percent by weight in solid.

When the content is too small, the color of the ink and the image density tend to deteriorate.

When the content is excessively large, the viscosity of the ink tends to increase, thereby degrading the ink discharging, which is not preferable in terms of economy. Surfactant As the surfactant, it is preferable to use a surfactant that has a low surface tension, a high permeability, and an excellent leveling property without degrading the dispersion stability irrespective of the kind of the hydrodispersible colorant and the combinational use with the organic solvent.

At least one kind of the surfactant selected from the group consisting of anionic surfactants, nonionic surfactants, silicone-containing surfactants, and fluorine-containing surfactants is preferable.

Among these, fluorine-containing surfactants are particularly preferable. These surfactants can be used alone or in combination.

A fluorine-containing surfactant in which the number of carbon atoms replaced with fluorine atoms is from 2 to 16 is preferable and, 4 to 16, more preferable.

When the number of the carbon atoms is too small, the effect of fluorine atoms may not be exhibited.

When the number of the carbon atom is too large, a problem with regard to the ink preservability, etc. may occur.

As the surfactants, for example, anionic fluorine-containing surfactants, nonionic fluorine-containing surfactants, amphoteric fluorine-containing surfactants, and oligomer type fluorine-containing surfactants can be used. Specific examples of the anionic fluorine-based surfactants include, but are not limited to, perfluoroalkyl sulfonic acid compounds, perfluoroalkyl carboxylic acid compounds, perfluoroalkyl phosphoric acid ester compounds, and polyoxyalkylene ether polymer compounds having a perfluoroalkyl ether group in its side chain.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these anionic fluorine-containing surfactants are, for example, Li, Ha, K, NH$_4$, NH$_3$CH$_2$CH$_2$OH, NH$_2$(CH$_2$CH$_2$OH)$_2$, NH(CH$_2$CH$_2$OH)$_3$.

Specific examples of the nonionic fluorine-containing surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Among these, the polyoxyalkylene ether polymer compounds having a perfluoroalkyl ether group in its side chain are preferable because of its small foaming property.

Specific examples thereof include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

In particular, the fluorine-containing surfactants represented by the following Formula 1 or 2 are preferable.

Formula 1

In Formula 1, m and n are 0 or integers of 1 or greater. m is preferably from 0 to 10 and n is preferably from 0 to 40 to impart the hydrosolubility.

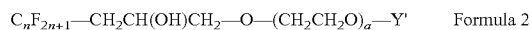

Formula 2

In Formula 2, n is an integer of from 2 to 6, a is an integer of from 15 to 50, Y' represents —C$_b$H$_{2b+1}$ (where b represents an integer of from 11 to 19) or —CH$_2$CH(OH)CH$_2$—C$_d$F$_{2d+1}$ (where d is an integer of from 2 to 6).

As a specific example of the fluorine-containing surfactants, the compounds represented by the following Formulae 3 to 11 are suitably used.

(1) Anionic Fluorine-Containing Surfactant

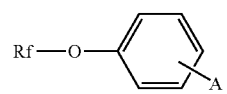

Formula 3

In Formula 3, Rf represents a mixture of a fluorine-containing hydrophobic group represented by the following Chemical Structure. A represents —SO₃X, —COOX, or —PO₃X, where X represents a counter anion. Specific examples thereof include, but are not limited to, H, Li, Na, K, NH₄, NH₃CH₂CH₂OH, NH₂(CH₂CH₂OH)₂, and NH(CH₂CH₂OH)₃.

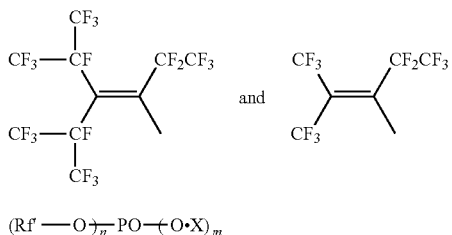

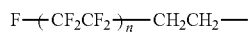

Formula 4

In Formula 4, Rf represents a fluorine-containing group represented by the following Chemical Structure. X represents the same as that of Formula 3. n is 1 or 2 and m is 2–n.

F—(CF₂CF₂)ₙ—CH₂CH₂—

In the Chemical Structure, n represents an integer of from 3 to 10.

Rf'—S—CH₂CH₂—COO.X      Formula 5

In Formula 5, Rf represents the same as that of Formula 4 and X represents the same as that of Formula 3.

Rf'—SO₃.X      Formula 6

In Formula 6, Rf represents the same as that of Formula 4 and X represents the same as that of Formula 3.

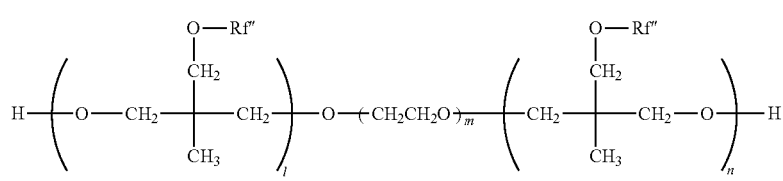

Formula 11

(2) Nonionic Fluorine-Containing Surfactant

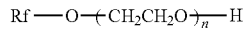

Formula 7

In Formula 7, Rf represents the same as that of Formula 3. n represents an integer of from 5 to 20.

Formula 8

In Formula 8, Rf represents the same as that of Formula 4. n represents an integer of from 1 to 40.

(3) Amphoteric Fluorine-Containing Surfactant

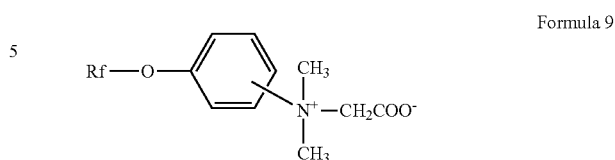

Formula 9

In Formula 9, Rf represents the same as that of Formula 3.

(4) Oligomer Type Fluorine-Containing Surfactant

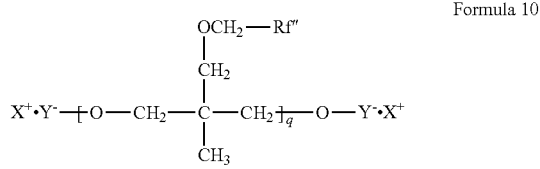

Formula 10

In Formula 10, Rf" represents a fluorine-containing group represented by the following Chemical Structure. X represents quaternary ammonium group, alkali metal such as sodim and potassium, triethyl amine, triethanol amine, and Y represents —CO, —SO₃, —SO₄, and —PO₄. q represents an integer of from 1 to 6.

F—(CF₂CF₂)ₙ—CH₂—

In the Chemical Structure, n represents an integer of from 1 to 4.

In Formula 11, Rf" represents the same as that of Formula 10. l, m, and n independently represent zero or integers of from 1 to 10.

In addition, with regard to the compound represented by Formula 2, the molecular weight (MWEO) of polyoxyethylene group [(CH₂CH₂O)ₙ portion] and the molecular weight (MWF) of fluoroalkyl group (CₙF₂ₙ₊₁ portion) are preferable to satisfy the relation: MWEO/MWF=2.2 to 10 because of the function of the surfactant and the solubility balance to water.

In addition, a preferred specific examples of the compounds represented by Formula 2 include, but are not limited to, the compounds represented by the following compounds of a) to v) in terms of their ability to reduce the surface tension and their high permeability.

In particular, the compounds a) to c) and the compounds n) to v) are preferable because they have good compatibility with the organic solvent.

a) $C_4F_9$—$CH_2CH(OH)CH_2O$—$(CH_2CH_2O)_{21}$—$C_{12}H_{25}$
b) $C_4F_9$—$CH_2CH(OH)CH_2O$—$(CH_2CH_2O)_{25}$—$C_{12}H_{25}$
c) $C_4F_9$—$CH_2CH(OH)CH_2O$—$(CH_2CH_2O)_{30}$—$C_{12}H_{25}$
d) $C_4F_9$—$CH_2CH(OH)CH_2O$—$(CH_2CH_2O)_{20}$—$C_{14}H_{29}$
e) $C_4F_9$—$CH_2CH(OH)CH_2O$—$(CH_2CH_2O)_{30}$—$C_{14}H_{29}$
f) $C_4F_9$—$CH_2CH(OH)CH_2O$—$(CH_2CH_2O)_{20}$—$C_{16}H_{33}$
g) $C_4F_9$—$CH_2CH(OH)CH_2O$—$(CH_2CH_2O)_{23}$—$C_{16}H_{33}$
h) $C_4F_9$—$CH_2CH(OH)CH_2O$—$(CH_2CH_2O)_{25}$—$C_{16}H_{33}$
i) $C_4F_9$—$CH_2CH(OH)CH_2O$—$(CH_2CH_2O)_{30}$—$C_{16}H_{33}$
j) $C_4F_9$—$CH_2CH(OH)CH_2O$—$(CH_2CH_2O)_{40}$—$C_{16}H_{33}$
k) $C_4F_9$—$CH_2CH(OH)CH_2O$—$(CH_2CH_2O)_{20}$—$C_{18}H_{37}$
l) $C_4F_9$—$CH_2CH(OH)CH_2O$—$(CH_2CH_2O)_{30}$—$C_{18}H_{37}$
m) $C_4F_9$—$CH_2CH(OH)CH_2O$—$(CH_2CH_2O)_{40}$—$C_{18}H_{37}$
n) $C_4F_9$—$CH_2CH(OH)CH_2O$—$(CH_2CH_2O)_{23}$—$CH_2CH(OH)CH_2$—$C_4F_9$
o) $C_4F_9$—$CH_2CH(OH)CH_2O$—$(CH_2CH_2O)_{35}$—$CH_2CH(OH)CH_2$—$C_4F_9$
p) $C_4F_9$—$CH_2CH(OH)CH_2O$—$(CH_2CH_2O)_{45}$—$CH_2CH(OH)CH_2$—$C_4F_9$
q) $C_6F_{13}$—$CH_2CH(OH)CH_2O$—$(CH_2CH_2O)_{21}$—$C_{12}H_{25}$
r) $C_6F_{13}$—$CH_2CH(OH)CH_2O$—$(CH_2CH_2O)_{25}$—$C_{12}H_{25}$
s) $C_6F_{13}$—$CH_2CH(OH)CH_2O$—$(CH_2CH_2O)_{30}$—$C_{12}H_{25}$
t) $C_6F_{13}$—$CH_2CH(OH)CH_2O$—$(CH_2CH_2O)_{23}$—$CH_2CH(OH)CH_2$—$C_6F_{13}$
u) $C_6F_{13}$—$CH_2CH(OH)CH_2O$—$(CH_2CH_2O)_{35}$—$CH_2CH(OH)CH_2$—$C_6F_{13}$
v) $C_7F_{13}$—$CH_2CH(OH)CH_2O$—$(CH_2CH_2O)_{45}$—$CH_2CH(OH)CH_2$—$C_6F_{13}$

Any product of the fluorine-containing surfactants available from the market can be used.

Specific examples of the products available from the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300 UR (all manufactured by Du Pont KABUSHIKI KAISHA); FT-110, FT-250, FT-251, FT-400S, FT-150 and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N, manufactured by DAIKIN INDUSTRIES). Among these, in terms of improvement on the printing quality, in particular the color property, and the permeability, the wettability, and the uniform dying property to paper, FS-300 of Du Pont KABUSHIKI KAISHA, FT-110, FT-250, FT-251, FT-400S, FT-150, and FT-400SW of NEOS COMPANY LIMITED, and POLYFOX PF-151N of OMNOVA SOLUTIONS INC. and UNIDYNE DSN-403N of DAIKIN INDUSTRIES are particularly preferable.

There is no specific limit to the selection of the silicone-based surfactants. Specific examples thereof include, but are not limited to, side-chain-modified polydimethyl siloxane, both end-modified polydimethylsiloxane, one end modified polydimethylsiloxane, and side-chain both end modified polydimethylsiloxane. In particular, a polyether-modified silicone-containing surfactant that has a polyoxyethylene group and/or a polyoxyethylene polyoxypropylene group is particularly preferable because of its good characteristics as an aqueous surfactant.

Any suitably synthesized surfactant and any product thereof available from the market is suitably usable. Products available from the market are easily obtained by Byc Chemie Japan Co., Ltd., Shin-Etsu Chemical Co., Ltd., Dow Corning Toray Co., Ltd., etc., NIHON EMULSION Co., Ltd., and KYOEI CHEMICAL CO., LTD.

There is no specific limit to the polyether-modified silicon-containing surfactant. For example, a compound in which the polyalkylene oxide structure represented by the following Formula 12 is introduced into the side chain of the Si site of dimethyl polysilooxane.

Formula 12

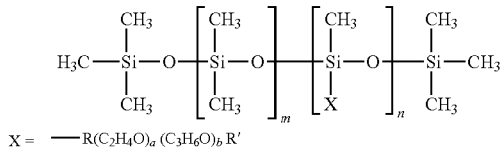

$X = $ —$R(C_2H_4O)_a (C_3H_6O)_b R'$

In Formula 12 illustrated above, m, n, a, and b independently represent integers. In addition, R and R' independently represent alkyl groups and alkylene groups.

Polyether-modified silicon-containing surfactant mentioned above are available from the market. Specific examples thereof include, but are not limited to, KF-618, KF-642, KF-643 (manufactured by Shin-Etsu Chemical Co., Ltd.), EMALEX-SS-5602 and SS-1906EX (NIHON EMULSION Co., Ltd.), FZ-2105, FZ-2118, FZ-2184, FZ-2161, FZ-2162, FZ-2163, and FZ-2164 (manufactured by Dow Corning Toray Co., Ltd.), BYK-33, BYK-387 (manufactured by Byc Chemie Japan Co., Ltd.), TSF4400, TSF4452, and TSF4453 (manufactured by Toshiba Silicone Co., Ltd.).

The compounds represented by the following formula and Formulae 13 and 14 are suitable as acetylene glycol or acetylene alcohol-based surfactant.

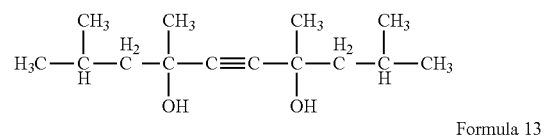

Formula 13

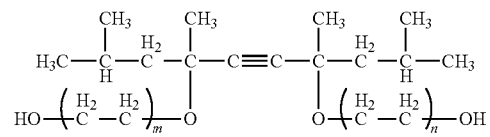

In Formula 13, m and n represent integers.

Formula 14

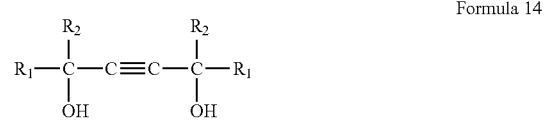

In Formula 14, $R_1$ and $R_2$ represent alkyl groups.

Acetylene glycol or acetylene alcohol-based surfactant mentioned above are available from the market. Specific examples thereof include, but are not limited to, DYNOL 604 and DYNOL 607 (manufactured by Air Products and Chemicals, Inc.), SURFYNOL 420, SURFYNOL 440, and SURFYNOL SE (manufactured by Nisshin Chemical Co., Ltd.), OLFINE E1004, OLFINE E1010, OLFINE EXP. 4001, OLF- INE EXP. 4200, OLFINE EXP. 4051F, and OLFINE EXP. 4123 (manufactured by Nisshin Chemical Co., Ltd.).

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyoxyethylene alkyl ether, polyoxypropylene polyoxyethylene alkyl ether, polyoxyethylene alkyl esters, polyoxy ethylene sorbitan aliphatic esters, polyoxyethylene alkyl phenyl ethers, polyoxyethylene alkyl amines, and polyoxyethylenealky amides.

The content of the surfactant in the ink is preferably from 0.001 percent by weight to 5 percent by weight and more preferably from 0.05 percent by weight to 1 percent by weight.

When the content is too small, the effect of adding the surfactant may decrease. When the content is too large, no difference may be exhibited by the increase.

Penetrating Agent

It is preferable to contain at least one kind of polyol compound or glycol ether compounds having non-wetting agent property and having 8 to 11 carbon atoms as a penetrating agent to strike a balance between the permeabitiliy and solubility to water. The non-wetting agent property means the solubility of from 0.2 percent by weight to 5.0 percent by weight in water at 25° C.

Preferred specific examples of the penetrating agent include, but are not limited to, 1,3-diol compounds represented by the following Formula 15. 2-ethyl-1,3-hexane diol (solubility: 4.2% at 25° C.) and 2,2,4-trimethyl-1,3-pentane diol (solubility: 2.0% at 25° C.) are particularly preferable.

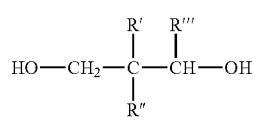

Formula 15

In Formula 15, R' represents a methyl group or an ethyl group, R" represents a hydrogen or a methyl group, and R'" represents an ethyl group or a propyl group.

Specific examples of the other polyol compounds having a non-wetting agent property include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

Any other permeating agents that can be dissolved in ink and adjusted to have desired characteristics can be used in combination. Specific examples thereof include, but are not limited to, alkyl and aryl ethers of polyols such as diethylene glycol monophenylether, ethylene glycol monophenylether, ethylene glycol monoaryl ether, diethylene glycol monophenyl ether, diethylene glycol monobutyl ether, propylene glycol monobutyl ether, and tetraethylene glycol chlorophenyl ether and lower alcohols such as ethanol.

The content of the permeating agent in the ink is preferably from 0.1 percent by weight to 40 percent by weight. When the content is too small, the obtained image may not dry quickly, resulting in production of blurred images. When the content is too large, the dispersion stability of the hydrodispersible colorant may deteriorate, which leads to easy clogging of nozzles and the excessive permeation on the recording medium, thereby decreasing the image density or causing strike-through.

Hydrodispersible Resin

The ink in the embodiment may contain a hydrodispersible resin.

Hydrodispersible resins having excellent film-forming (image forming) property, water repellency, water-resistance, and weather resistance are usable.

Therefore, these are suitable for image recording requiring high water-resistance and high image density (high coloring property).

Specific examples thereof include, but are not limited to, condensation-based synthetic resins, addition-based synthetic resins, and natural polymers.

Specific examples of the condensation-based synthesis resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based synthetic resins include, but are not limited to, polyolefin resins, polystyrene resins, polyvinyl alcohol resins, polyvinyl ester resins, polyacrylic acid resins, and unsaturated carboxylic acid resins.

Specific examples of the natural resins include, but are not limited to, celluloses, rosins, and natural rubber.

Among these, polyurethane resin particulates, acrylic-silicone resin particulates, and fluorine-containing resin particulates are preferable.

These is no problem about using the hydrodispersible resins alone or in combination.

As the fluorine-containing resin particulates, fluorine-containing resin particulates having fluoro-olefin units are preferable. Among these, fluorine-containing vinyl ether resin particulates formed of fluoro-olefin units and vinyl ether units are particularly preferable.

There is no specific limit to the fluoro-olefin units.

Specific examples thereof include, but are not limited to, —$CF_2CF_2$—, —$CF_2CF(CF_3)$—, and —$CF_2CFCl$—.

There is no specific limit to the vinyl ether units. For example, the groups represented by the following structures are suitable.

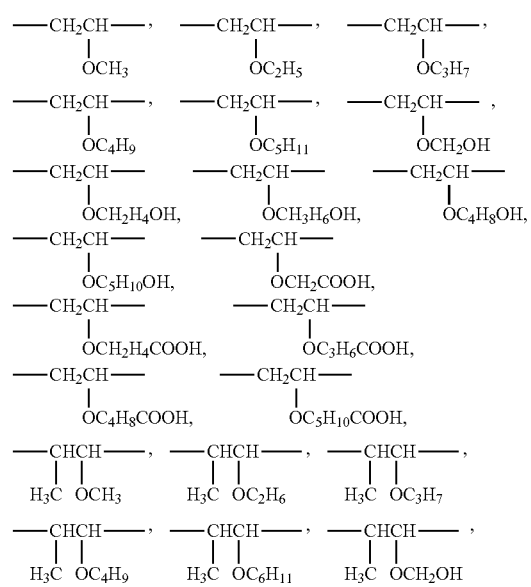

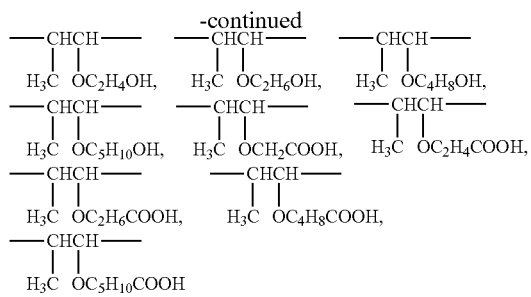

As the fluorine-containing vinyl ether resin particulates formed of the fluoro-olefin units and the vinyl ether units, alternate copolymers in which the fluoro-olefin units and the vinyl ether units are alternately co-polymerized are preferable.

Any suitably synthesized fluorine-containing resin particulates and products thereof available from the market can be used.

Specific examples of the products available in the market include, but are not limited to, FLUONATE FEM-500, FEM-600, DICGUARD F-52S, F-90, F-90M, F-90N, and AQUA FURAN TE-5A (all manufactured by DIC COPORATION); and LUMIFLON FE4300, FE4500, and FE4400, ASAHI GUARD AG-7105, AG-950, AG-7600, AG-7000, and AG-1100 (all manufactured by ASAHI GLASS CO., LTD.).

The hydrodispersible resin may used as a homopolymer, a copolymer, or a complex resin. In addition, any of a single-phase structure type, core-shell type, or power field type emulsion is usable.

A hydrodispersible resin that has a hydrophilic group with self-dispersiblity or no dispersibility while dispersibility is imparted to a surfactant or a resin having a hydrophilic group can be used as the hydrodispersible resin. Among these, emulsions of resin particles obtained by emulsification polymerization or suspension polymerization of ionomers or unsaturated monomers of a polyester resin or polyurethane resin are most suitable.

In the case of emulsification polymerization of an unsaturated monomer, since a resin emulsion is obtained by reaction in water to which an unsaturated monomer, a polymerization initiator, a surfactant, a chain transfer agent, a chelate agent, a pH adjusting agent, etc. are added, it is easy to obtain a hydrodispersible resin and change the resin components. Therefore, a hydrodispersible resin having target properties is easily obtained.

Specific examples of the unsaturated monomers include, but are not limited to, unsaturated carboxylic acids, mono-functional or poly-functional(meth)acrylic ester monomers, (meth)acrylic amide monomers, aromatic vinyl monomers, vinyl cyano compound monomers, vinyl monomers, arylated compound monomers, olefin monomers, dien monomers, and oligomers having unsaturated carbon.

These can be used alone or in combination. When these are used in combination, the resin properties can be easily reformed.

The resin properties can be reformed by polymerization reaction and graft reaction using an oligomer type polymerization initiator.

Specific examples of the unsaturated carboxylic acids include, but are not limited to, acrylic acid, methacrylic acid, itaconic acid, fumaric acid, and maleic acid.

Specific examples of the mono-functional (meth)acrylic ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hyxyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyltrimethyl ammonium salts, 3-methcryloxy propyl trimethoxy silane, methyl acrylate, ethylacrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Specific examples of poly-functional (meth)acrylic ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, 2,2'-bis(4-methacryloxy diethoxyphenylpropane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexane diol diacrylate, neopentyl glycol diacrylate, 1,9-nonane diol diacrylate, polypropylene glycol diacrylate, 2,2'-bis(4-acryloxy propyloxyphenyl)propane, 2,2'-bis(4-acryloxy diethoxyphenyl) propane trimethylol propane triacrylate, trimethylol ethane triacrylate, tetramethylol methane triacrylate, ditrimethylol tetraacryalte, tetramethylol methane tetraacrylate, pentaerythritol tetraacrylate, and dipentaerythritol hexaacrylate.

Specific examples of the (meth)acrylic amide monomers include, but are not limited to, acrylic amides, methacrylic amides, N,N-dimethyl acrylic amides, methylene bis acrylic amides, and 2-acrylic amide-2-methyl propane sulfonates.

Specific examples of the aromatic vinyl monomers include, but are not limited to, styrene, α-methylstyrene, vinyl toluene, 4-t-butyl styrene, chlorostyrene, vinyl anisole, vinyl naphthalene, and divinyl benzene.

Specific examples of the vinyl cyano compound monomers include, but are not limited to, acrylonitrile, and methacrylonitrile.

Specific examples of the vinyl monomers include, but are not limited to, vinyl acetate, vinylidene chloride, vinyl chloride, vinyl ether, vinyl ketone, vinyl pyrolidone, vinyl sulfonic acid and its salts, vinyl trimethoxy silane, and vinyl triethoxy silane.

Specific examples of the arylated compound monomers include, but are not limited to, aryl sulfonic acid and its salts, aryl amine, aryl chloride, diaryl amine, and diaryl dimethyl ammonium salts.

Specific examples of the olefin monomers include, but are not limited to, ethylene and propylene.

Specific examples of the dien monomers include, but are not limited to, butadiene and chloroprene.

Specific examples of the oligomers having unsaturated carbon include, but are not limited to, styrene oligomers having a methacryloyl group, styrene-acrylonitrile oligomers having a methacryloyl group, methyl methacrylate oligomers having a methacryloyl group, dimethyl siloxane oligomers having a methacryloyl group, and polyester oligomers having an acryloyl group, Since breakage in molecule chains such as dispersion destruction and hydrolytic cleavage occurs to the hydrodispersible resins in a strong alkali or strong acid environment, pH is preferably from 4 to 12, more preferably from 6 to 11, and furthermore preferably from 7 to 9 in terms of the miscibility with the hydrodispersible colorant.

The volume average particle diameter (D50) of the hydrodispersible resin is related to the viscosity of the liquid dispersion.

If the compositions are the same, the viscosity of the same solid portion increases as the particle diameter decreases.

To avoid preparing ink having an excessively high viscosity, the volume average particle diameter (D50) of the hydrodispersible resin is preferably 50 nm or greater.

In addition, particles having a larger particle diameter than the size of the nozzle mouth of the inkjet head are not usable.

When large particles smaller than the nozzle mouth are present in the ink, the discharging property of the ink deteriorates.

The volume average particle diameter (D50) of the hydrodispersible resin in the ink is preferably 200 nm or less and more preferably 150 nm or less so as not to degrade the ink discharging property.

In addition, preferably the hydrodispersible resin fixes the hydrodispersible colorant on paper and forms a film at room temperature to improve the fixing property of the coloring material. Therefore, the minimum film-forming temperature (MFT) of the hydrodispersible resin is preferably 30° C. or lower. In addition, when the glass transition temperature of the hydrodisdpersible resin is lower than −40° C., the viscosity of the resin film increases, thereby causing the obtained image sheet to increase tackness. Therefore, the glass transition temperature of the hydrodisdpersible resin is preferably −40° C. or higher.

The content of the hydrodispersible resin in the ink is preferably from 2 percent by weight to 30 percent by weight and more preferably from 5 percent % by weight to 25 percent by weight in solid.

Other Components

There is no specific limit to the selection of the other components blended with the ink. Optionally, pH adjusting agents, defoaming agents, antisepsis and anti-fungal agents, chelate reagents, anti-corrosion agents, anti-oxidants, ultra-violet absorbers, oxygen absorbers, and photostabilizing agents can be blended in the ink of the present disclosure.

Any pH adjusters that can adjust the pH of prescribed ink to be from 7 to 11 without having an adverse impact on the ink can be used. Specific examples thereof include, but are not limited to, alcohol amines, alkali metal hydroxides, ammonium hydroxides, phosphonium hydoxides, and alkali metal carbonates.

When the pH is too high or too low, the dissolved content of the head of ink jet and an ink supplying unit tends to increase, which leads to problems such as alteration, leakage, and bad discharging of ink.

Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide and quaternary ammonium hydroxide.

Specific examples of the phosphonium hydroxide include, but are not limited to, quaternary phosphonium hydroxide.

Specific examples of the alkali metal carbonates include, but are not limited to, lithium carbonate, sodium carbonate, and potassium carbonate.

Defoaming Agent

The ink of the Embodiment contains a minute amount of defoaming agent to reduce foaming. The foaming means that a liquid forms a thin film to wrap air. The properties of ink such as surface tension and viscosity have impacts on generating foams.

That is, a force to make the surface area as least as possible is applied to the liquid such as water having a high surface tension so that such no or little foaming occurs. To the contrary, ink having a high viscosity and high permeabitility tends to foam because the surface tension thereof is low so that the the foam formed due to the viscosity of the liquid is easily maintained and does not easily burst.

In general, to burst foams, a defoaming agent reduces the surface tension of the foam film locally or a defoaming agent insoluble in a foaming liquid is scattered on the surface of the foaming liquid. In a case in which ink contains a fluorine-containing surfactant able to reduce the surface tension extremely, the defoaming agent that reduces the surface tension locally is not capable of reducing the surface tension locally. Therefore, the defoaming agent insoluble in a foaming agent is used instead, thereby destabilizing the ink.

On the other hand, the defoaming agent represented by the following Formula 16 is less able to reduce the surface tension than the fluorine-containing surfactant but is highly compatible therewith. Therefore, the defoaming agent is efficiently taken in by the foam film, so that the surface of the foam film becomes an unequilibrium state locally due to the difference of the surface tension between the fluorine-containing surfactant and the defoaming agent.

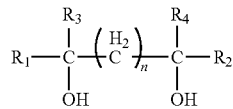

Formula 16

In Formula 16, $R_1$ and $R_2$ independently represent alkyl groups having 3 to 6 carbon atoms, $R_3$ and $R_4$ independently represent alkyl groups having 1 or 2 alkyl groups, and n represents an integer of from 1 to 6.

Preferred specific examples of the compounds represented by Formula 16 include, but are not limited to, 2,4,7,9-tetramethyl decane-4,7-diol and 2,5,8,11-tetramethyl dodecane-5,8-diol.

In terms of the effect of reducing foams and the compatibility with ink, 2,5,8,11-tetramethyl dodecane-5,8-diol is particularly preferable.

The content of the defoaming agent in the ink is preferably from 0.01 percent by weight to 10 percent by weight and more preferably from 0.1 percent by weight to 5 percent by weight. When the content is too small, defoaming is not satisfactory in some cases. When the content is too large, the defoaming effect hits the peak and moreover the ink properties such as viscosity and particle diameter may have adversely been affected.

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Specific examples of the chelate reagents include, but are not limited to, ethylene diamine sodium tetraacetate, nitrilo sodium triacetate, hydroxyethylethylene diamine sodium triacetate, diethylene triamine sodium quinternary acetate, and uramil sodium diacetate.

Specific examples of the anti-corrosion agents include, but are not limited to, acid sulfite, thiosodium sulfate, ammonium thiodiglycolate, diisopropyl ammonium nitride, pentaerythritol quaternary nitdride, and dicyclohexyl ammonium nitride.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants. Specific examples of the phenol-based anti-oxidants (including hindered phenol-based anti-oxidants) include, but are not limited to, butylated hydroxy anisol, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis{1,1-dimethyl-2-[β-(3-tert-butyl-4-hydroxy-5-methylphenonl)propyonyloxy]ethyl}-2,4,8-10-tetraoxa spiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Specific examples of the amine-based anti-oxidants include, but are not limited to, phenyl-β-naphtylamine, α-naphtyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxy anisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane, and 1,1,3-tris(2-methyl-4-hydroxy-5-tert-butylphenyl)butane.

Specific examples of the sulfur-based anti-oxidants include, but are not limited to, dilauryl-3,3'-thio dipropionate, distearyl thiodipropionate, laurylstearyl thiodipropionate, dimyristyl-3,3'-thiodipropionate, distearyl-β,β'-thiodipropionate, 2-mercaptobenzo imidazole, and dilauryl sulfide.

Specific examples of phosphorous-based anti-oxidants include, but are not limited to, triphenylphosphite, octadecylphosphite, triisodecylphosphite, trilauryltrithiophosphite, and trinonylphenyl phosphite.

Specific examples of the ultraviolet absorbers include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

Specific examples of the benzophenone-based ultraviolet absorbers include, but are not limited to, 2-hydroxy-4-n-octoxybenzophenone, 2-hydroxy-4-n-dodecyloxy benzophenone, 2,4-dihydroxy benzophenone, 2-hydroxy-4-methoxy-benzophenone, and 2,2',44'-tetrahydroxy benzophenone.

Specific examples of the benzotriazole-based ultraviolet absorbers include, but are not limited to, 2-(2'-hydroxy-5'-tert-octylphenyl)benzo triazole, 2-(2'-hydroxy-5'-methylphenyl)benzo triazole, 2-(2'-hydroxy-4'-octoxyphenyl) benzo triazole, and 2-(2'-hydroxy-3'-tert-butyl-5'-methylphenyl)-5-chlorobenzo triazole.

Specific examples of the salicylate-based ultraviolet absorbers include, but are not limited to, phenyl salicylate, p-tert-butylphenyl salicylate, and p-octylphenyl salicylate.

Specific examples of the cyanoacrylate-based ultraviolet absorbers include, but are not limited to, ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex salt-based ultraviolet absorbers include, but are not limited to, nickel-bis(octylphenyl)sulfide, 2,2'-thiobis(4-tert-octyl ferrate)-n-butylamine nickel (II), 2,2'-thiobis(4-tert-octyl ferrate)-2-ethylhexyl amine nickel (II), and 2,2'-thiobis(4-tert-octyl ferrate)triethanol amine nickel (II).

Preparation of Ink for Inkjet Recording

The ink for inkjet recording for use in the present disclosure is manufactured by dispersing or dissolving a hydrodispersible colorant, an organic solvent, a surfactant, a penetrating agent, and water with optional components in an aqueous medium followed by stirring and mixing, if desired. The dispersion and mixing are conducted by a sand mill, a homogenizer, a ball mill, a paint shaker, an ultrasonic dispersing agent, etc.

Stirring and mixing can be conducted by a stirrer having a typical stirring wing, a magnetic stirrer, a high speed dispersing device, etc.

The ink can be accommodated in a container such as an ink cartridge for use.

Ink Properties

The ink for use in the present disclosure preferably has a viscosity of from 5 mPa·s to 25 mPa·s and more preferably from 5 mPa·s to 25 mPa·s at 25° C. When the ink viscosity is 5 mPa·S or greater, the printing density and text quality are improved. When the ink viscosity is 25 mPa·s or less, a suitable ink discharging property is secured. The viscosity can be measured by, for example, a viscometer (RE-550L, manufactured by TOKI SANGYO CO., LTD.) at 25° C.

The ink for use in the present disclosure preferably has a dynamic surface tension of 26 mN/m or less and more preferably 25 mN/m at a surface life of 150 msec at 25° C. and 50 percent RH as measured by maximum bubble pressure technique. When the dynamic surface tension is 26 mN/m or less, the wettability and the permeability to the recording medium become suitable and the image density and the text blurring are improved. Furthermore, the re-transferability and white mottles are improved.

The ink for use in the present disclosure is used in any printer having an inkjet head of a piezoelectric element type in which ink droplets are discharged by transforming a vibration plate forming the wall of the ink flowing path using a piezoelectric element as a pressure generating device to press the ink in the ink flowing path as described in JP-H2-51734-A; a thermal type in which bubbles are produced by heating ink in the ink flowing path with a heat element as described in JP-S61-59911-A; and an electrostatic type in which ink droplets are discharged by changes of the volume in the ink flowing path caused by transforming a vibration plate that forms the wall surface of the ink flowing path by an electrostatic force generated between the vibration plate and the electrode while the vibration plate and the electrode are provided facing each other as described in JP-H6-71882-A.

Image Forming Method and Image Forming Apparatus

The image forming method of the present disclosure includes an ink discharging process with optional processes such as a stimulus generating process and a control process.

The image forming apparatus that executes the image forming method of the present disclosure includes an ink discharging device with other optional devices such as a stimulus generating device and a control device. In addition, the ink discharging process conducted by other processes are suitably conducted by the other corresponding devices.

In addition, the other processes are suitably conducted by the other optional devices.

For example, a printer shown in FIGURE, which is a schematic view illustrating an inner configuration of a printer for usable in this embodiment.

In an image recording apparatus A, a paper feed tray 1 includes a base 5, and a pressure plate 2 and a paper rotor 4 feeding a recording paper 3 installed thereon. The pressure plate 2 is rotatable around a rotational axis installed on the base 5, and biased by the pressure plate spring 6 to the paper rotor 4. A separating pad formed of a material having large friction coefficient such as an artificial skin is formed on a part of the pressure plate 2, facing the paper rotor 4 to prevent double feed of the recording paper 3. In addition, a release cam releasing contact between the pressure plate 2 and the paper rotor 4 is arranged.

The release cam pushes the pressure plate 2 down to a predetermined position before starting printing, and the contact between the pressure plate 2 and the paper rotor 4 is released.

When a drive force from a feed roller 7 is transmitted by a gear or the like to the paper rotor 4 and the release cam, the release cam leaves from the pressure plate 2 and the pressure plate 2 rises to contact the paper rotor 4 to the recoding paper 3. Then, with rotation of the paper rotor 4, the recording paper 2 is picked up and separated one by one by a separating click. The paper rotor 4 rotates to feed the recording paper 3 to a platen 10 through a feed guides 8 and 9. The recoding paper 3 passes between the feed guides 8 and 9 and is fed to the feed roller 7, and to platen 10 thereby and a pinch roller 11. Then, contact between the recording paper 3 and the paper rotor 4 is released and the drive force from a feed roller 7 is shut.

A paper feed rotor 12 for manual paper feed feeds the recoding paper 3 on a manual tray 13 according to a recording order signal to the feed roller 7. The recording paper 3 fed to the platen 10 passes under a line head 14.

The feeding speed of the recording paper and a droplet discharge timing are adjusted, based on a signal controlled by an electric circuit to form a desired image.

Ink Discharging Process (Example of Image Forming Process)

In the ink discharging process, a stimulus (energy) is applied to the ink to discharge the ink to form an image on a recording medium. Any known method of forming images by discharging ink onto a recording medium is suitable in this process.

Specific examples of such methods include, but are not limited to, an inkjet recording method of scanning by a recording head and an inkjet recording method using aligned recording heads to record images on a recording medium.

There is no specific limit to the system of driving a recording head.

Specific examples thereof include, but are not limited to, a piezoelectric actuator using lead zirconate titanate (PZT), an actuator employing a system applying a heat energy, a recording head of on-demand type using an actuator utilizing an electrostatic force, and a recording head of a continuous spraying type charge control system.

Optionally, the image forming method of the present disclosure may include a process of heating and drying the recording medium onto which ink is discharged is provided. For example, the recording medium can be dried by using an infra red drier, a microwave drier, a roll heater, a drum heater, or warm air.

Moreover, it is also possible to provide a fixing process of fixing an image by heating the surface thereof to 100° C. to 150° C. by a heating device to smooth and fix the surface.

This fixing process improves the gloss and the fixability of the image printed matter.

A roller or a drum heater having a heated mirror surface is suitably used as the heating device and the mirror surface (smoothing portion) is brought into contact with the image formed surface. The heating temperature is preferably is from 100° C. to 150° C. considering the image quality, safety, and economy.

Having generally described preferred embodiments, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto.

Preparation Example 1

Preparation of Surface Reformed Black Pigment Dispersion Element 1

Mix 100 g of Black Pearls® 1000 (carbon black having a BET specific surface area of 343 $m^2/g$ and a DBPA of 105 m/100g, manufactured by Cabot Corporation), 100 milimole of sulfanilic acid, and 1 litter of highly deionized water by a Silverson Mixer at 6,000 rpm in room temperature environment. After 30 minutes, gradually add 100 milimole of sodium nitrite dissolved in a minute amount of highly deionized water to the mixture. Furthermore, heat the system to 60° C. to conduct reaction for one hour while stirring to produce a reformed pigment in which sulfanilic acid is added to carbon black. Next, adjust the pH of the product to be 9 with 10% tetrabutyl ammonium hydroxide solution (methanol solution) to obtain a reformed pigment dispersion element in 30 minutes. Conduct ultra-filtration using the dispersion element containing a pigment linked with at least one sulphanilic acid group or sulphanilic acid tetrabutyl ammonium salt and a highly deionized water through dialysis membrane followed by ultrasonic dispersion to obtain a reformed pigment dispersion element with a pigment solid portion of 20%. The surface treatment level is 0.75 milimole/g and the volume average particle diameter (D50) measured by a particle size distribution measuring instrument (NANOTRAC UPA-EX150, manufactured by NIKKISO CO., LTD.) is 120 nm.

Preparation Example 2

Preparation of Surface Reformed Black Pigment Dispersion Element 2

Place 500 g of Black Pearls® 880 (carbon black having a BET specific surface area of 220 $m^2/g$ and a DBPA of 105 ml/100 g, manufactured by Cabot Corporation), 1 litter of highly deionized water, and 1 mole of 4-amino benzoic acid in ProcessAL1 4HV Mixer (4 L). Next, vigorously mix the system at 300 rpm while heating at 60° C. for 10 minutes. Add to this 20% sodium nitrite aqueous solution (1 mole equivalent based on 4-amino benzoic acid) in 15 minutes. Mix and stir the system for three hours while heating to 60° C. Take out the reactant while diluting with 750 ml of highly deionized water. Next, adjust the pH of the product to be 9 with 10% tetrabutyl ammonium hydroxide solution (methanol solution) to obtain a reformed pigment dispersion element in 30 minutes. Conduct ultrafiltration using the dispersion element containing a pigment linked with at least one amino benzoic acid group or amino benzoic acid tetrabutyl ammonium salt and a highly deionized water through dialysis membrane followed by ultrasonic dispersion to obtain a reformed pigment dispersion element with a pigment solid portion of 20%. The surface treatment level is 0.5 milimole/g and the volume average particle diameter (D50) measured by a particle size distribution measuring instrument (NANOTRAC UPA-EX150, manufactured by NIKKISO CO., LTD.) is 104 nm.

Preparation Example 3

Preparation of Surface Reformed Black Pigment Dispersion Element 3

Conduct acid deposition of 1 kg of pigment dispersion element of SENSIENT Black SDP2000 (Solid portion: 14.5%, manufactured by SENSIENT Corporation) with 0.1 N HCL aqueous solution. Next, adjust the pH of the product to be 9 with 10% tetrabutyl ammonium hydroxide solution (methanol solution) to obtain a reformed pigment dispersion element in 30 minutes. Conduct ultrafiltration using the dispersion element containing a pigment linked with at least one carboxylic acid group and sulphanilic acid group, carboxylic acid tetrabutyl ammonium salt, and a highly deionized water through dialysis membrane followed by ultrasonic dispersion to obtain a reformed pigment dispersion element with a pigment solid portion of 20%. The volume average particle diameter (D50) measured by a particle size distribution measuring instrument (NANOTRAC UPA-EX 150, manufactured by NIKKISO CO., LTD.) is 120 nm.

Preparation Example 4

Preparation of Surface Reformed Magenta Pigment Dispersion Element 1

Conduct acid deposition of 1 kg of SMART Magenta 3122BA (Pigment Red 122 surface treated dispersion element, Solid portion: 14.5%, manufactured by SENSIENT Corporation) with 0.1 N HCL aqueous solution. Next, adjust the pH of the product to be 9 with 10% tetraethyl ammonium hydroxide solution to obtain a reformed pigment dispersion element in 30 minutes. Conduct ultrafiltration using the dispersion element containing a pigment linked with at least one amino benzoic acid group or amino benzoic acid tetraethyl ammonium salt and a highly deionized water through dialysis membrane followed by ultrasonic dispersion to obtain a reformed pigment dispersion element with a pigment solid portion of 20%. The volume average particle diameter (D50) measured by a particle size distribution measuring instrument (NANOTRAC UPA-EX150, manufactured by NIKKISO CO., LTD.) is 104 nm.

Preparation Example 5

Preparation of Surface Reformed Magenta Pigment Dispersion Element 1

Conduct acid deposition of 1 kg of SMART Cyan 3154BA (Pigment Blue 15:4 surface treated dispersion element, Solid portion: 14.5%, manufactured by SENSIENT Corporation) with 0.1 N HCL aqueous solution. Next, adjust the pH of the product to be 9 with 40% benzyl trimethyl ammonium hydroxide solution (methanol solution) to obtain a reformed pigment dispersion element in 30 minutes. Conduct ultrafiltration using the dispersion element containing a pigment linked with at least one amino benzoic acid group or amino benzoic acid benzyl trimethyl ammonium salt and a highly deionized water through dialysis membrane followed by ultrasonic dispersion to obtain a reformed pigment dispersion element with a pigment solid portion of 20%. The volume average particle diameter (D50) measured by a particle size distribution measuring instrument (NANOTRAC UPA-EX150, manufactured by NIKKISO CO., LTD.) is 116 nm.

Preparation Example 6

Preparation of Surface Reformed Yellow Pigment Dispersion Element 1

Next, adjust the pH of the product to be 9 with 10% tetrabutyl ammonium hydroxide solution (methanol solution) of SMART Yellow 3074BA (Pigment Yellow 74 surface treated dispersion element, solid portion: 14.5%, manufactured by SENS1ENT Corporation) to obtain a reformed pigment dispersion element in 30 minutes. Conduct ultrafiltration using the dispersion element containing a pigment linked with at least one amino benzoic acid group or amino benzoic acid tetrabutyl ammonium salt and a highly deionized water through dialysis membrane followed by ultrasonic dispersion to obtain a reformed pigment dispersion element with a pigment solid portion of 20%. The volume average particle diameter (D50) measured by a particle size distribution measuring instrument (NANOTRAC UPA-EX150, manufactured by NIKKISO CO., LTD.) is 145 nm.

Preparation Example 7

Preparation of Carbon Black Pigment Containing Polymer Particulate Dispersion Element
Preparation of Polymer Solution A After sufficient replacement with nitrogen gas in a flask equipped with a mechanical stirrer, a thermometer, a nitrogen gas introducing tube, a reflux tube, and a dripping funnel, Mix 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol followed by heating the system to 65° C. Next, drip a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone into the flask in two and a half hours. Subsequent to dripping, drip a liquid mixture of 0.8 g of azobis methyl valeronitrile and 18 g of methylethyl ketone into the flask in half an hour. After one-hour aging at 65° C., add 0.8 g of azobismethyl valeronitrile followed by another one-hour aging. After the reaction, add 364 g of methylethyl ketone to the flask to obtain 800 g of a polymer solution A having a concentration of 50% percent weight.
Preparation of Carbon Black Pigment Containing Polymer Particulate Dispersion Element Sufficiently stir 28 g of the polymer solution A, 42 g of C.I. carbon black (FW100, manufactured by Degussa AG), 13.6 g of 1 mol/1 potassium hydroxide solution, 20 g of methylethyl ketone, and 13.6 g of deionized water followed by mixing and kneading with a roll mill. Place the obtained paste in 200 g of deionized water followed by sufficient stirring. Distill away methylethyl ketone and water using an evaporator and remove coarse particles by filtrating the thus-obtained liquid dispersion with a polyvinylidene fluoride membrane filter having an average hole diameter of 5.0 μm under pressure to obtain a carbon black pigment containing polymer particulate liquid dispersion containing a solid pigment portion in an amount of 15 percent by weight with a solid portion concentration of 20 percent by weight.

The volume average particle diameter (D50) of the polymer particulate in the liquid dispersion measured by a particle size distribution measuring instrument (NANOTRAC UPA-EX150, manufactured by NIKKISO CO., LTD.) is 104 nm.

Examples 1 to 12 and Comparative Examples 1 to 4

Preparation of Ink for Inkjet Recording

As shown in Table 1, mix the organic solvent, the wetting agent, the surfactant, and the mildew-proofing agent, and water followed by a one-hour stirring to obtain a uniform mixture. In addition, depending on Examples and Comparative Examples, add the hydrodispersible resin followed by a one-hour stirring. Next, add the hydrodispersible colorant (pigment dispersion element), the defoaming agent, and the pH control agent followed by a one-hour stirring. Remove coarse particles and dust from the thus-obtained mixture by using a polyvinilydene fluoride membrane filter having an average hole diameter of 1.2 μm under pressure to prepare each ink for inkjet recording of Examples 1 to 12 and Comparative Examples 1 and 4.

TABLE 1

| Component (percent by weight) | | Example 1 | Example 2 | Example 3 | Example 4 | Example 5 |
|---|---|---|---|---|---|---|
| Hydro-dispersible colorant (Pigment dispersion element) | Surface modified black pigment dispersion element 1 (Preparation Example 1) | 37.50 | — | — | 37.50 | 37.50 |
| | Surface modified black pigment dispersion element 2 (Preparation Example 2) | — | 37.50 | — | — | — |
| | Surface modified black pigment dispersion element 3 (Preparation Example 3) | — | — | 37.50 | — | — |
| | Surface modified magenta pigment dispersion element 1 (Preparation Example 4) | — | — | — | — | — |
| | Surface modified cyan pigment dispersion element 1 (Preparation Example 5) | — | — | — | — | — |
| | Surface modified yellow pigment dispersion element 1 (Preparation Example 6) | — | — | — | — | — |
| | Carbon black pigment containing polymer particulate dispersion element (Preparation 7) | — | — | — | — | — |
| Hydro-Dispersible resin | Acrylic silicone resin emulsion | 5.00 | 5.00 | 3.00 | 5.00 | 5.00 |
| | Fluorine-resin emulsion | — | — | 1.00 | — | — |
| Organic Solvent | Amide compound of Chemical Structure II | 10.00 | — | — | 10.00 | 10.00 |
| | Amide compound of Chemical Structure III | — | 10.00 | — | — | — |
| | Amide compound of Chemical Structure IV | — | — | 10.00 | — | — |
| | Compound of Chemical Structure V | 10.00 | — | 10.00 | 10.00 | 10.00 |
| | Compound of Chemical Structure VII | — | 10.00 | — | — | — |
| | Compound of Chemical Structure I | 10.00 | 7.50 | — | 10.00 | 10.00 |
| Wetting agent | Glycerin | 10.00 | 10.00 | 10.00 | 10.00 | 10.00 |
| | 1,3-butane diol | — | — | 7.50 | — | — |
| | 1,2-hexane diol | — | — | — | — | — |
| Penetrating agent | 2-ethyl-1,3-hexane diol | 2.00 | 2.00 | 2.00 | 2.00 | 2.00 |
| | 2,2,4-trimethyl-1,3-pentane diol | — | — | — | — | — |
| Surfactant | KF-643 | — | — | — | — | — |
| | Zonyl FS-300 | — | — | — | — | — |

TABLE 1-continued

| Component (percent by weight) | | Example 1 | Example 2 | Example 3 | Example 4 | Example 5 |
|---|---|---|---|---|---|---|
| | Compound q represented by Formula 2 | 0.50 | 0.75 | 0.600 | 1.00 | 0.50 |
| | SURFYNOL 104E | — | — | — | — | 0.50 |
| | SOFTANOL EP-7025 | — | — | — | — | — |
| Mildew-proofing agent | Proxel GXL | 0.05 | 0.05 | 0.05 | 0.05 | 0.05 |
| Defoaming agent | 2,4,7,9-tetramethyl decane-4,7-diol | 0.05 | — | 0.05 | 0.05 | 0.05 |
| | 2,5,8,11-tetramethyl dodecane-5,8-diol | — | 0.50 | — | — | — |
| pH controlling agent | 2-amino-2-ethyl-1,3-propane diol | 0.20 | 0.20 | 0.20 | 0.20 | 0.20 |
| | Pure water | Rest | Rest | Rest | Rest | Rest |
| Total (percent by weight) | | 100 | 100 | 100 | 100 | 100 |

TABLE 2

| Component (percent by weight) | | Example 6 | Example 7 | Example 8 | Example 9 | Example 10 |
|---|---|---|---|---|---|---|
| Hydro-dispersible colorant (Pigment dispersion element) | Surface modified black pigment dispersion element 1 (Preparation Example 1) | 37.50 | — | — | — | 37.50 |
| | Surface modified black pigment dispersion element 2 (Preparation Example 2) | — | — | — | — | — |
| | Surface modified black pigment dispersion element 3 (Preparation Example 3) | — | — | — | — | — |
| | Surface modified magenta pigment dispersion element 1 (Preparation Example 4) | — | 37.50 | — | — | — |
| | Surface modified cyan pigment dispersion element 1 (Preparation Example 5) | — | — | 22.5 | — | — |
| | Surface modified yellow pigment dispersion element 1 (Preparation Example 6) | — | — | — | 22.50 | — |
| | Carbon black pigment containing polymer particulate dispersion element (Preparation 7) | — | — | — | — | — |
| Hydro-Dispersible resin | Acrylic silicone resin emulsion | 5.00 | 5.00 | 5.00 | 5.00 | — |
| | Fluorine-resin emulsion | — | — | — | — | — |
| Organic Solvent | Amide compound of Chemical Structure II | 10.00 | 10.00 | 10.00 | 10.00 | 10.00 |
| | Amide compound of Chemical Structure III | — | — | — | — | — |
| | Amide compound of Chemical Structure IV | — | — | — | — | — |
| | Compound of Chemical Structure V | 10.00 | — | 20.00 | 22.50 | 10.00 |

TABLE 2-continued

| Component (percent by weight) | | Example 6 | Example 7 | Example 8 | Example 9 | Example 10 |
|---|---|---|---|---|---|---|
| | Compound of Chemical Structure VII | — | 10.00 | — | — | — |
| | Compound of Chemical Structure I | 10.00 | 10.00 | 10.00 | 7.50 | 10.00 |
| Wetting agent | Glycerin | 10.00 | 10.00 | 10.00 | 12.00 | 10.00 |
| | 1,3-butane diol | — | — | — | — | — |
| | 1,2-hexane diol | — | — | — | — | — |
| Penetrating agent | 2-ethyl-1,3-hexane diol | 2.00 | 2.00 | 2.00 | 2.00 | 2.00 |
| | 2,2,4-trimethyl-1,3-pentane diol | — | — | — | — | — |
| Surfactant | KF-643 | — | 0.50 | — | — | — |
| | Zonyl FS-300 | 5.0 | — | — | — | — |
| | Compound q represented by Formula 2 | — | 0.50 | 0.75 | 0.75 | 0.75 |
| | SURFYNOL 104E | — | — | — | — | — |
| | SOFTANOL EP-7025 | — | 0.10 | — | — | — |
| Mildew-proofing agent | Proxel GXL | 0.05 | 0.05 | 0.05 | 0.05 | 0.05 |
| Defoaming agent | 2,4,7,9-tetramethyl decane-4,7-diol | 0.50 | 0.50 | 0.50 | 0.50 | 0.50 |
| | 2,5,8,11-tetramethyl dodecane-5,8-diol | — | — | — | — | — |
| pH controlling agent | 2-amino-2-ethyl-1,3-propane diol | 0.20 | 0.20 | 0.20 | 0.20 | 0.20 |
| | Pure water | Rest | Rest | Rest | Rest | Rest |
| Total (percent by weight) | | 100 | 100 | 100 | 100 | 100 |

TABLE 3

| Component (percent by weight) | | Example 11 | Example 12 | Comparative Example 1 | Comparative Example 2 | Comparative Example 3 | Comparative Example 4 |
|---|---|---|---|---|---|---|---|
| Hydro-dispersible colorant (Pigment dispersion element) | Surface modified black pigment dispersion element 1 (Preparation Example 1) | — | 37.50 | — | 37.50 | 37.50 | — |
| | Surface modified black pigment dispersion element 2 (Preparation Example 2) | — | — | — | — | — | — |
| | Surface modified black pigment dispersion element 3 (Preparation Example 3) | — | — | — | — | — | — |
| | Surface modified magenta pigment dispersion element 1 (Preparation Example 4) | — | — | — | — | — | — |
| | Surface modified cyan pigment | | | | | | |

TABLE 3-continued

| Component (percent by weight) | | Example 11 | Example 12 | Comparative Example 1 | Comparative Example 2 | Comparative Example 3 | Comparative Example 4 |
|---|---|---|---|---|---|---|---|
| | dispersion element 1 (Preparation Example 5) | | | | | | |
| | Surface modified yellow pigment dispersion element 1 (Preparation Example 6) | — | — | — | — | — | — |
| | Carbon black pigment containing polymer particulate dispersion element (Preparation 7) | 50.00 | — | 50.00 | — | — | 50.00 |
| Hydro-Dispersible resin | Acrylic silicone resin emulsion | — | 5 | — | 5.00 | 5.00 | — |
| | Fluorine-resin emulsion | — | — | — | — | — | — |
| Organic Solvent | Amide compound of Chemical Structure II | 5.00 | 8.00 | — | — | 10.00 | — |
| | Amide compound of Chemical Structure III | — | — | — | — | — | — |
| | Amide compound of Chemical Structure IV | — | — | — | — | — | — |
| | Compound of Chemical Structure V | 5.00 | 10.00 | — | — | 10.00 | — |
| | Compound of Chemical Structure VII | — | — | — | — | — | — |
| | Amide compound of Chemical Structure I | 10.00 | 8.00 | — | — | 10.00 | — |
| Wetting agent | Glycerin | 10.00 | 8.00 | 20.00 | 10.00 | 10.00 | 8.50 |
| | 1,3-butane diol | — | — | 15.00 | — | — | 19.50 |
| | 1,2-hexane diol | — | — | — | 15.00 | — | — |
| Penetrating agent | 2-ethyl-1,3-hexane diol | — | 2.00 | 2.00 | 2.00 | 2.00 | 2.00 |
| | 2,2,4-trimethyl-1,3-pentane diol | — | — | — | — | — | — |
| Surfactant | KF-643 | — | — | — | — | — | — |
| | Zonyl FS-300 | — | — | 2.50 | — | — | — |
| | Compound q represented by Formula 2 | 1.00 | 1.20 | — | — | — | 0.004 |
| | SURFYNOL 104E | — | — | — | 2.00 | — | — |
| | SOFTANOL EP-7025 | — | — | — | — | 1.00 | — |
| Mildew-proofing agent | Proxel GXL | 0.05 | 0.05 | 0.05 | 0.05 | 0.05 | 0.05 |
| Defoaming agent | 2,4,7,9-tetramethyl decane-4,7-diol | 0.50 | 0.20 | 0.40 | 0.40 | 0.40 | 0.196 |
| | 2,5,8,11-tetramethyl dodecane-5,8-diol | — | — | — | — | — | — |

TABLE 3-continued

| Component (percent by weight) | | Example 11 | Example 12 | Comparative Example 1 | Comparative Example 2 | Comparative Example 3 | Comparative Example 4 |
|---|---|---|---|---|---|---|---|
| pH controlling agent | 2-amino-2-ethyl-1,3-propane diol | 0.20 | 0.03 | 0.20 | 0.20 | 0.20 | 0.20 |
| | Pure water | Rest | Rest | Rest | Rest | Rest | Rest |
| Total (percent by weight) | | 100 | 100 | 100 | 100 | 100 | 100 |

Product names, etc. shown in Tables 1 to 3 are as follows:
Acrylic silicone resin emulsion: Polyzole ROY6312, solid portion: 39.9 percent by weight, average particle diameter: 171 nm, Minimum Film-forming Temperature (MFT): 20° C., manufactured by SHOWA HIGHPOLYMER CO., LTD.)
Fluorine-containing emulsion: LUMIFLON FE4500, solid portion: 50 percent by weight, average particle diameter: 150 nm, minimum film-forming temperature (MFT): 30° C. or lower, manufactured by ASAHI GLASS CO., LTD.)
KF-643: Polyether modified silicone compound (effective component: 100 percent, manufactured by Shin-Etsu Chemical Co., Ltd.)
Zonyl FS-300: Polyoxyethylene perfluoroalkyl ether (component: 40 percent, manufactured by Du Pont Kabushiki Kaisha)
SURFYNOL® 104E: Acetylene glycol based compound (effective component: 50% m, ethylene glycol, manufactured by Nisshin Chemical Co., Ltd.)
SOFTANOL EP-7025: Polyoxyalkylene alkyl ether (component: 100 percent, manufactured by NIPPON SHOKUBAI CO., LTD.)
PROXEL GXL: Mildew-proofing agent mainly composed of 1,2-benzothiazolin-3-one (component: 20 percent, containing dipropylene glycol, manufactured by Avecia)

Measure the properties of each ink of Examples and Comparative Examples by the following method. The results are shown in Table 4.
Viscosity (mPa·s)
Measure the viscosity of the ink by a viscometer (RE-550L, manufactured by TOKI SANGYO CO.,LTD.) at 25° C.
pH
Measure the pH of the ink at 25° C. by a pH meter (HM-30R type, manufactured by DKK-TOA CORPORATION).
Dynamic Surface Tension (γ')
Measure the dynamic surface tension (γ') at the surface life of 150 msec at 25° C. and 50% RH by SITA_DynoTester (available from SITA) as measured by maximum bubble pressure technique.

TABLE 4

| | Ink properties | | |
|---|---|---|---|
| | Viscosity (mpa·s) | pH | 150 msec dynamic surface tension γ' (mN/m) |
| Example 1 | 8.0 | 9.4 | 24.9 |
| Example 2 | 8.4 | 9.6 | 22.7 |
| Example 3 | 9.4 | 9.3 | 24.4 |
| Example 4 | 8.2 | 9.3 | 21.8 |
| Example 5 | 8.2 | 9.7 | 24.2 |
| Example 6 | 8.3 | 9.5 | 25.8 |
| Example 7 | 8.1 | 9.3 | 23.1 |
| Example 8 | 8.2 | 9.2 | 23.5 |
| Example 9 | 8.2 | 9.6 | 23.6 |
| Example 10 | 7.2 | 9.5 | 22.8 |
| Example 11 | 8.5 | 9.6 | 22.3 |
| Example 12 | 7.1 | 8.8 | 20.5 |
| Comparative Example 1 | 8.2 | 9.7 | 28.1 |
| Comparative Example 2 | 3.8 | 9.4 | 26.9 |
| Comparative Example 3 | 8.1 | 9.8 | 39.5 |
| Comparative Example 4 | 7.9 | 9.5 | 31.5 |

Measure the contact angle of each ink to a recording medium of Examples and Comparative Examples by the following method. The results are shown in Table 5.
Contact Angle θ°
Use a contact angle measuring instrument (OCAH 200, manufactured by DataPhysics Corporation) to measure the contact angle θ on the following recording medium at 25° C. and 50% RH 150 msec after 2.5 μl of the ink on the recording medium is dripped.
Recording Medium

TABLE 5

| | | DSA (ml/m²) | |
|---|---|---|---|
| Media | Manufacturer | Contact time 100 msec | Contact time 400 msec |
| MyPaper | Ricoh Co., Ltd. | 8.1 | 11.3 |
| RecyclePaper 100 | Daio Paper Corporation | 10.4 | 16.0 |
| MyRecyclePaper 100 | Ricoh Co., Ltd. | 11.5 | 17.5 |
| HM_Fore_MP (USA) (ColorLok paper) | INTERNATIONAL PAPER | 10.6 | 15.0 |
| Domtar_copy (ColorLok paper) | Domtar | 15.1 | 25.2 |
| Data_copy (ColorLok paper) | Data Copy | 10.5 | 14.2 |

In Table 5, HM_Fore_MP represents HAMMERMILL_Fore_MP.

The values in Table 5 are highly deionized transfer amount measured at 22° C. to 24° C. at 45 percent RH to 55 percent RH by using an automatic scanning absorptometer (DSA, manufactured by KUMAGAI RIM KOGYO Co., Ltd.).
γ' cos θ
Calculate γ' cos θ from the dynanic surface tension γ' and the contact angle θ.
Using each ink of Examples and Comparative Examples, evaluate the images formed on the recording media of Table 6 as follows. The results are shown in Tables 7 to 9.

Recording Medium

TABLE 6

| Recording Medium (paper) | Medium | Manufacturer | DSA (ml/m²) Contact time 100 msec | DSA (ml/m²) Contact time 400 msec |
|---|---|---|---|---|
| Recording paper 1 | MyPaper | Ricoh Co., Ltd. | 8.1 | 11.3 |
| Recording paper 2 | RecyclePaper 100 | Daio Paper Corporation | 10.4 | 16.0 |
| Recording paper 3 | HM_Fore_MP (USA) (ColorLok paper) | INTERNATIONAL PAPER | 10.6 | 15.0 |

Ink Discharging Process

In an environment at 22.5° C. to 23.5° C. and 45% RH to 55% RH, using an inkjet recording device (IPSiO GXe-5500, manufactured by RICOH CO., LTD.), change the driving voltage of the piezo element to have the same amount of ink discharged so that the attachment amount of the ink is the same among the recording media. Set the printing mode of the inkjet recording device to "Plain Paper_Fast" to form images.

Image Density

Print a chart of "Black Square" of 64 point text made by using Microsoft Word 2000 on each recording medium shown in Table 6 and measure the color of the black square portion of the printing surface by X-Rite 939 to evaluate them based on the following criteria.

The printing mode used: A modified mode in which "Plain Paper—Standard Fast" is modified to "No Color Calibration" from the user setting for plain paper by the driver installed onto the printer.

Evaluation Criteria
    E (Excellent):
        Black: 1.25 or greater
        Yellow: 0.8 or greater
        Magenta: 1.00 or greater
        Cyan: 1.05 or greater
    G (Good):
        Black: 1.20 to less than 1.25
        Yellow: 0.75 to less than 0.8
        Magenta: 0.95 to less than 1.00
        Cyan: 1.00 to less than 1.05
    F (Fair):
        Black: 1.15 to less than 1.20
        Yellow: 0.70 to less than 0.75
        Magenta: 0.90 to less than 0.95
        Cyan: 0.95 to less than 1.00
    B (Bad):
        Black: less than 1.15
        Yellow: less than 0.70
        Magenta: less than 0.90
        Cyan: less than 0.95

Text Blurring

Print a chart of texts of 12 points made by using Microsoft Word 2000 (manufactured by Microsoft Corporation) on each recording medium shown in Table 6 and evaluate them based on the following criteria. The printing mode used: A modified mode in which "Plain Paper—Standard Fast" is modified to "No Color Calibration" from the user setting for plain paper by the driver installed onto the printer.

Evaluation Criteria
    G (Good): No text blurring observed
    F (Fair): Slight text blurring observed
    B (Bad): Text blurring observed Re-transferability As in the case of the evaluation of the image density, print the charge of "Black Square" on each recording medium, 5 seconds thereafter press JIS L0806 Cotton No. 3 on the printed portion, roll a load roller of 2 kg thereon, visually observe the contamination caused by ink attachment to the cotton, and evaluate the contamination of the cotton according to the following criteria.

Evaluation Criteria 1
    E (Excellent): No ink attachment
    G (Good): Ink having a diameter of 0.1 mm or less attached to several portions
    F (Fair): Ink having a diameter of 1 mm or less attached to 10 or more portions
    B (Bad): Ink attachment on the entire recording medium

TABLE 7

| | | Example 1 | Example 2 | Example 3 | Example 4 | Example 5 | Example 6 |
|---|---|---|---|---|---|---|---|
| 150 msec dynamic surface tension γ' (mN/m) | | 24.9 | 22.7 | 24.4 | 21.8 | 24.2 | 25.5 |
| Contact angle θ (° C.) at 150 msec | MyPaper | 20.5 | 18.4 | 19.7 | 17.6 | 19.5 | 20.5 |
| | RecyclePaper 100 | 23.4 | 21.0 | 22.5 | 20.1 | 22.2 | 23.4 |
| | HM_Fore_MP (USA) (ColorLok paper) | 19.6 | 17.6 | 18.9 | 16.9 | 18.6 | 19.8 |
| γ' cosθ at 150 msec | MyPaper | 23.2 | 21.5 | 23.0 | 20.8 | 22.8 | 23.9 |
| | RecyclePaper 100 | 22.8 | 21.2 | 22.5 | 20.5 | 22.4 | 23.4 |
| | HM_Fore_MP (USA) (ColorLok paper) | 23.4 | 21.6 | 23.1 | 20.9 | 22.9 | 24.0 |
| Image density | MyPaper | E | E | E | E | E | E |
| | RecyclePaper 100 | E | E | E | E | E | E |
| | HM_Fore_MP (USA) (ColorLok paper) | E | E | E | E | E | E |

TABLE 7-continued

|  |  | Example 1 | Example 2 | Example 3 | Example 4 | Example 5 | Example 6 |
|---|---|---|---|---|---|---|---|
| Text blurring | MyPaper | G | G | G | G | G | G |
|  | RecyclePaper 100 | G | G | G | G | G | G |
|  | HM_Fore_MP (USA) (ColorLok paper) | G | G | G | G | G | G |
| Re-transferebility | MyPaper | E | E | E | E | E | E |
|  | RecyclePaper 100 | E | E | E | E | E | E |
|  | HIM_Fore_MP (USA) (ColorLok paper) | G | E | G | E | G | G |

TABLE 8

|  |  | Example 7 | Example 8 | Example 9 | Example 10 | Example 11 | Example 12 |
|---|---|---|---|---|---|---|---|
| 150 msec dynamic surface tension γ' (mN/m) | | 23.1 | 23.5 | 23.6 | 22.8 | 22.3 | 20.5 |
| Contact angle θ (° C.) at 150 msec | MyPaper | 18.8 | 19.0 | 19.1 | 18.4 | 18.0 | 20.3 |
|  | RecyclePaper 100 | 21.5 | 21.8 | 21.9 | 21.0 | 20.6 | 22.1 |
|  | HM_Fore_MP (USA) (ColorLok paper) | 18.1 | 18.3 | 18.4 | 17.6 | 17.3 | 19.7 |
| γ' cosθ at 150 msec | MyPaper | 21.9 | 22.2 | 22.3 | 21.6 | 21.2 | 19.2 |
|  | RecyclePaper 100 | 21.5 | 21.8 | 21.9 | 21.3 | 20.9 | 19.0 |
|  | HM_Fore_MP (USA) (ColorLok paper) | 22.0 | 22.3 | 22.4 | 21.7 | 21.3 | 19.3 |
| Image density | MyPaper | E | E | E | E | E | E |
|  | RecyclePaper 100 | E | E | E | E | E | E |
|  | HM_Fore_MP (USA) (ColorLok paper) | E | E | E | E | E | E |
| Text blurring | MyPaper | G | G | G | G | G | G |
|  | RecyclePaper 100 | G | G | G | G | G | G |
|  | HM_Fore_MP (USA) (ColorLok paper) | G | G | G | G | G | G |
| Re-transferebility | MyPaper | E | E | E | E | E | E |
|  | RecyclePaper 100 | E | E | E | E | E | E |
|  | HM_Fore_MP (USA) (ColorLok paper) | E | E | E | E | E | E |

TABLE 9

|  |  | Comparative Example 1 | Comparative Example 2 | Comparative Example 3 | Comparative Example 4 |
|---|---|---|---|---|---|
| 150 msec dynamic surface tension γ' (mN/m) | | 28.1 | 26.9 | 39.5 | 31.5 |
| Contact angle θ (° C.) at 150 msec | MyPaper | 22.0 | 13.1 | 39.4 | 39.0 |
|  | RecyclePaper 100 | 30.6 | 24.2 | 52.4 | 52.0 |
|  | HM_Fore_MP (USA) (ColorLok paper) | 23.1 | 18.5 | 36.5 | 36.0 |

TABLE 9-continued

|  |  | Comparative Example 1 | Comparative Example 2 | Comparative Example 3 | Comparative Example 4 |
|---|---|---|---|---|---|
| γ'cosθ at 150 msec | MyPaper | 26.0 | 26.2 | 30.5 | 24.5 |
|  | RecyclePaper 100 | 24.2 | 24.5 | 24.1 | 19.4 |
|  | HM_Fore_MP (USA) (ColorLok paper) | 25.8 | 25.5 | 31.8 | 25.5 |
| Image density | MyPaper | G | E | F | F |
|  | RecyclePaper 100 | F | F | B | B |
|  | HM_Fore_MP (USA) (ColorLok paper) | E | E | G | G |
| Text blurring | MyPaper | F | G | F | B |
|  | RecyclePaper 100 | F | F | B | B |
|  | HM_Fore_MP (USA) (ColorLok paper) | G | G | G | G |
| Re-transferebility | MyPaper | F | E | F | F |
|  | RecyclePaper 100 | F | G | B | B |
|  | HM_Fore_MP (USA) (ColorLok paper) | B | B | B | B |

As shown above, in the present disclosure, an inkjet image forming method is provided by which images having high image quality, in particular, regarding image density, text blurring, re-transferring property are printed. Furthermore, the image printed matter formed by the image forming method has blur-free high quality image and excellent in stability over time so that it can be suitably used as documents on which texts and/or images are recorded for various purposes.

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet recording method comprising:
discharging ink on a recording medium to form an image thereon, wherein the ink comprises:
a hydrodispersible colorant having a functional group, a surfactant, water, a polyol having an equilibrium moisture of 30 percent by weight or greater at 23° C. and 80 percent RH, an amide compound represented by Formula I, and an oxetane compound represented by Formula II;
wherein the recording medium has a transfer amount of highly deionized water of from 5 ml/m² to 20 ml/m² during a contact time of 100 msec and 5 ml/m² to 30 ml/m² during a contact time of 400 msec, in which the transfer amount is measured by an automatic scanning absorptometer; and
wherein the ink has a wettability γ' cos θ of from 19.0 to 24.0 150 msec after ejecting 2.5 μl of the ink onto the recording medium and γ' is 26 mN/m or less,
where γ' represents dynamic surface tension at a surface life of 150 msec at 25° C. and 50 percent RH as measured by maximum bubble pressure technique and θ represents a contact angle of 150 msec at 25° C. and 50 percent RH after 2.5 μl of the ink is ejected onto the recording medium,

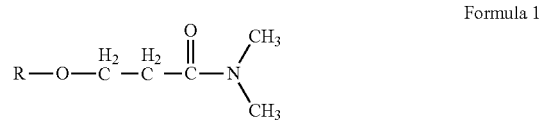

Formula 1 where R represents an alkyl group having 4 to 6 carbon atoms,

Formula 2 where $R_3$ represent a hydrogen atom, an alkyl group having 1 to 8 carbon atoms, a cyclohexyl group, and a phenyl group.

2. The inkjet recording method according to claim 1, wherein the ink further comprises an amide compound represented by Chemical Structure I:

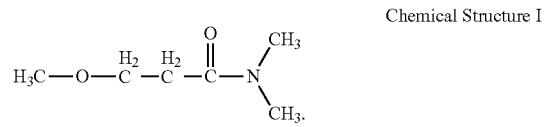

Chemical Structure I

3. The inkjet recording method according to claim 1, wherein the ink comprises a black pigment, a cyan pigment, a magenta pigment, a yellow pigment, or a combination thereof as hydrodispersible colorant.

4. The inkjet recording method according to claim 1, wherein the surfactant is a fluorine-based surfactant.

5. Inkjet printed matter comprising:
a recording medium; and
an image formed thereon by the inkjet recording method of claim 1.

6. The inkjet recording method according to claim 1, wherein the ink comprises one or more compounds of Formula I selected from the group consisting of Chemical Structure II, Chemical Structure III, and Chemical Structure IV:

Chemical Structure II

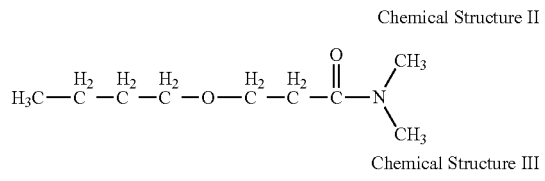

Chemical Structure III

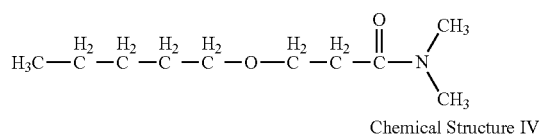

Chemical Structure IV

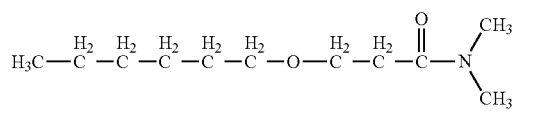

and one or more compounds of Formula II selected from the group consisting of Chemical Structure V, Chemical Structure VI, Chemical Structure VII, Chemical Structure VIII, Chemical Structure IX, and Chemical Structure X:

Chemical Structure V

Chemical Structure VI

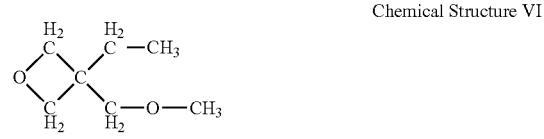

Chemical Structure VII

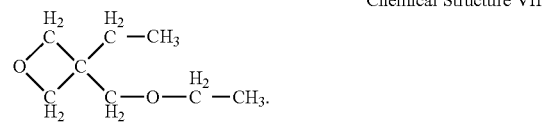

7. The inkjet recording method according to claim 6, wherein the ink further comprises an amide compound represented by Chemical Structure I:

Chemical Structure I

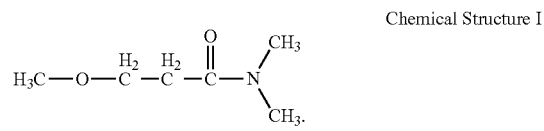

* * * * *